(12) United States Patent
Yoshida et al.

(10) Patent No.: US 9,549,162 B2
(45) Date of Patent: Jan. 17, 2017

(54) IMAGE PROCESSING APPARATUS, IMAGE PROCESSING METHOD, AND PROGRAM

(71) Applicant: Sony Corporation, Tokyo (JP)

(72) Inventors: Kyosuke Yoshida, Kanagawa (JP); Kenji Tanaka, Kanagawa (JP); Yukihiro Nakamura, Kanagawa (JP); Yoshihiro Takahashi, Kanagawa (JP); Kentaro Fukazawa, Tokyo (JP); Kazumasa Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 39 days.

(21) Appl. No.: 14/033,069

(22) Filed: Sep. 20, 2013

(65) Prior Publication Data

US 2014/0086556 A1   Mar. 27, 2014

(30) Foreign Application Priority Data

Sep. 27, 2012   (JP) .................................. 2012-213527

(51) Int. Cl.
   *H04N 9/80*   (2006.01)
   *H04N 9/79*   (2006.01)
   *G06K 9/00*   (2006.01)
   *G06F 17/30*   (2006.01)

(52) U.S. Cl.
   CPC .......... *H04N 9/79* (2013.01); *G06F 17/30247* (2013.01); *G06K 9/00288* (2013.01); *G06K 9/00744* (2013.01); *G06K 9/00751* (2013.01); *G06K 9/00765* (2013.01)

(58) Field of Classification Search
   CPC ..................... G06F 17/30247; G06K 9/00288; G06K 9/00744; G06K 9/00751; G06K 9/00765; H04N 9/79
   USPC .................................. 386/241, 248, 230, 234
   See application file for complete search history.

(56) References Cited

U.S. PATENT DOCUMENTS

| | | | |
|---|---|---|---|
| 6,602,297 B1* | 8/2003 | Song .............................. | 715/210 |
| 7,797,328 B2* | 9/2010 | Styles ........................... | 707/758 |
| 8,880,599 B2* | 11/2014 | Svendsen .......... | H04L 29/08729 709/204 |
| 9,418,380 B2* | 8/2016 | Yamahara .............. | G06Q 30/06 |
| 2004/0120688 A1* | 6/2004 | Poltorak .............. | G11B 27/105 386/240 |
| 2007/0050816 A1* | 3/2007 | Davis ................... | G11B 27/034 725/47 |
| 2008/0240671 A1* | 10/2008 | Yamasaki ......... | G06F 17/30796 386/240 |
| 2009/0059008 A1* | 3/2009 | Ishii ..................... | G11B 27/034 348/169 |
| 2009/0138505 A1* | 5/2009 | Purdy ............... | G06F 17/30743 |
| 2010/0098250 A1* | 4/2010 | Schultz ................ | G06T 1/0071 380/200 |
| 2010/0135580 A1* | 6/2010 | Liu .................... | G06K 9/00268 382/195 |
| 2011/0074971 A1* | 3/2011 | Kwon ................... | H04N 5/232 348/222.1 |

(Continued)

*Primary Examiner* — Helen Shibru
(74) *Attorney, Agent, or Firm* — Frommer Lawrence & Haug LLP; William S. Frommer

(57) ABSTRACT

An image processing apparatus includes a display control unit that causes a content view which displays statistic information of characters appearing in video content and a relationship view which displays character-relation information of the characters appearing in the video content, to be displayed on a predetermined display unit.

13 Claims, 27 Drawing Sheets

(56) References Cited

U.S. PATENT DOCUMENTS

| | | | |
|---|---|---|---|
| 2011/0222782 A1* | 9/2011 | Kashiwagi | G06K 9/00711 382/218 |
| 2012/0147265 A1* | 6/2012 | Gu et al. | 348/473 |
| 2013/0028522 A1* | 1/2013 | Perlmutter et al. | 382/197 |
| 2013/0042262 A1* | 2/2013 | Riethmueller | G06F 17/30846 725/14 |
| 2013/0151969 A1* | 6/2013 | Campbell et al. | 715/720 |
| 2013/0227246 A1* | 8/2013 | Hirao | G06F 12/0246 711/206 |
| 2014/0086496 A1* | 3/2014 | Yoshida | G06K 9/6215 382/220 |

\* cited by examiner $y = x$
$(0.25 \leq x \leq 1.0)$ $y = 1.0$
$(0.25 \leq x \leq 1.0)$

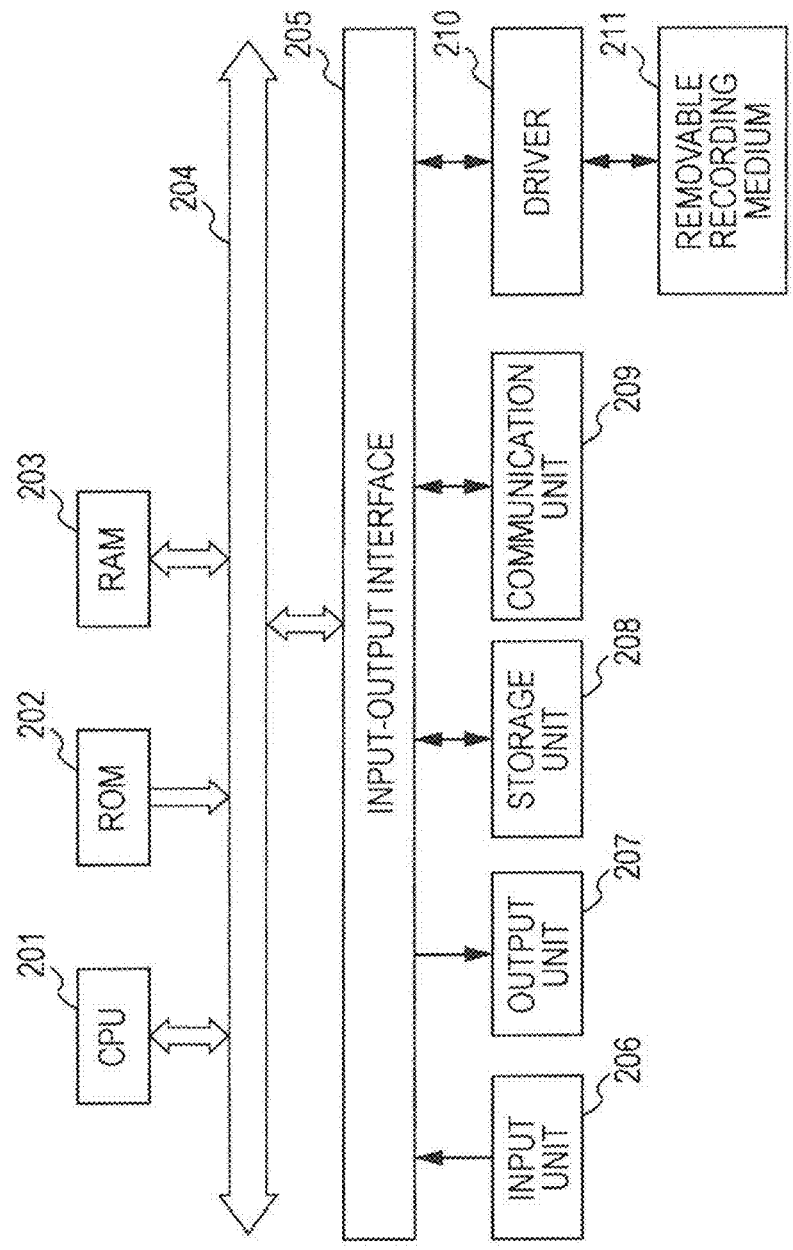

IMAGE PROCESSING APPARATUS, IMAGE PROCESSING METHOD, AND PROGRAM

BACKGROUND

The present disclosure relates to an image processing apparatus, an image processing method, and a program, particularly to an image processing apparatus, an image processing method, and a program that enable searching for a scene which is difficult to be searched out with a spatial feature amount of an image.

A number of technologies are proposed, which can search a database, in which a plurality of moving image content is stored, for a similar scene that is similar to a specific scene.

Searching for the similar scene usually includes, extracting a feature amount of a scene that is desired to be searched (scene for searching), and detecting a scene as the similar scene, which has a similar feature amount to the scene for searching among other moving image content stored in the database.

As an extracted feature amount, for example, spatial information of an image (still images) that forms the moving image, such as a histogram and an edge histogram of color spatial information, is used (refer to Japanese Unexamined Patent Application Publication No. 2010-97246). In addition, in order to make it possible to search for the desired content easily, there is also a case in that the content are classified into any one of a plurality of categories in advance using meta data (for example, refer to Japanese Unexamined Patent Application Publication No. 2008-70959).

SUMMARY

However, in the scene searching such as detecting a scene that has a similar spatial feature amount of an image, it is difficult to search for a scene which has a semantic relationship but does not have any relationship in spatial feature amount. For example, when editing, even though a scene of Mitsunari Ishida being routed after the scene of Ieyasu Tokugawa in the Battle of Sekigahara is desired, it is difficult to search for the scene of Mitsunari Ishida from the feature amount of the scene of Ieyasu Tokugawa.

It is desired to make it possible to search for the scene which is difficult to be searched out only with the spatial feature amount of the image.

An image processing apparatus according to an embodiment of the present disclosure includes a display control unit that causes a content view which displays statistic information of characters appearing in video content and a relationship view which displays character-relation information of the characters appearing in the video content, to be displayed on a predetermined display unit.

An image processing method according to another embodiment of the present disclosure includes causing a content view which displays statistic information of characters appearing in video content and a relationship view which displays character-relation information of character appearing in the video content to be displayed on a predetermined display unit.

A program according to still another embodiment of the present disclosure causes a computer to function as a display control unit that causes a content view which displays statistic information of characters appearing in video content and a relationship view which displays character-relation information of the characters appearing in the video content, to be displayed on a predetermined display unit.

In the embodiments of the present disclosure, the content view which displays the statistic information of the characters appearing in the video content and the relationship view which displays the character-relation information of the characters appearing in the video content are displayed on the predetermined display unit.

In addition, the program can be provided by being transmitted via transmission media or provided by being recorded in recording media.

The image processing apparatus may be an independent apparatus, or may be an internal block that configures one apparatus.

According to the embodiments of the present disclosure, it is possible to search for the scene which is difficult to be searched out only with the spatial feature amount of the image.

BRIEF DESCRIPTION OF THE DRAWINGS

FIG. 27 is a block diagram illustrating an example of a configuration of a computer according to an embodiment to which the present disclosure is applied.

DETAILED DESCRIPTION OF EMBODIMENTS

Example of Configuration of Image Processing Apparatus

Figure 1:
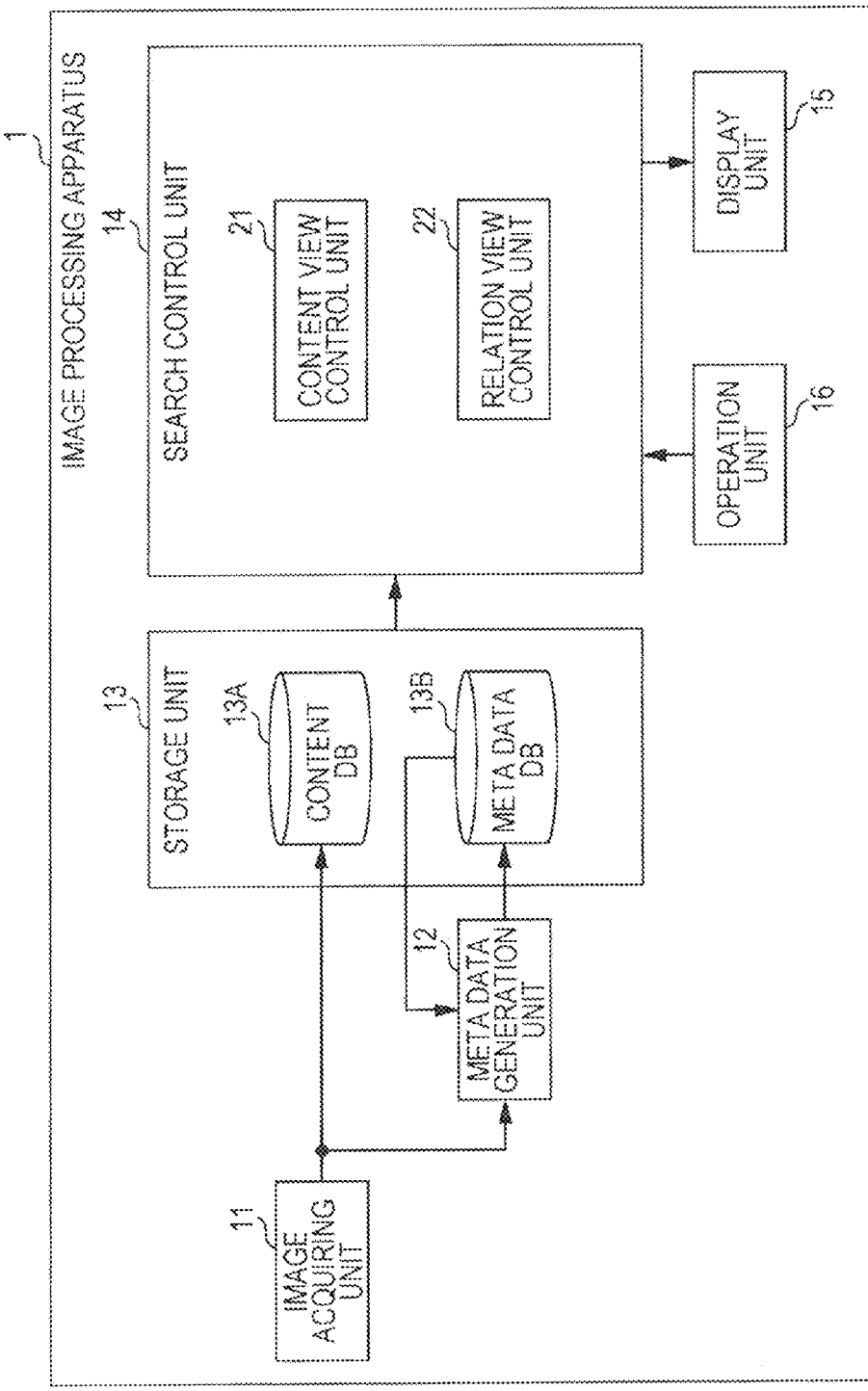
FIG. 1 is a block diagram illustrating an example of a configuration of an image processing apparatus to which the present disclosure is applied according to an embodiment.

FIG. 1 is a block diagram illustrating an example of a configuration of an image processing apparatus to which the present disclosure is applied according to an embodiment.

An image processing apparatus 1 in FIG. 1 is an apparatus that accumulates video content (moving image content) which is input, and searches for a desired video content from the accumulated video content based on information of a character appearing in the video content.

The image processing apparatus 1 is configured to include an image acquiring unit 11, a meta data generation unit 12, a storage unit 13, a search control unit 14, a display unit 15, and an operation unit 16.

The image acquiring unit 11 acquires content data of the video content supplied from other apparatus, and supplies to the meta data generation unit 12 and the storage unit 13.

The meta data generation unit 12 generates meta data of the (content data of the) video content supplied from the image acquiring unit 11, and supplies to the storage unit 13. In the meta data generation, other meta data of the video content stored in the storage unit 13 is referenced, if necessary. The detail of the meta data generated by the meta data generation unit 12 will be described below.

The storage unit 13 includes a content DB 13A that stores the content data of a plurality of video content and a meta data DB 13B that stores the meta data of each video content. That is, the content data of the video content supplied from the image acquiring unit 11 is stored in the content DB 13A, and the meta data corresponding to the content data is supplied from the meta data generation unit 12 to be stored in the meta data DB 13B. In the embodiment, the content DB 13A and the meta data DB 13B are separated. However, the content DB 13A and the meta data DB 13B do not have to be necessarily separated, it may be sufficient if the content DB 13A and the meta data DB 13B are stored in association with each other.

The search control unit 14 causes a screen for searching (detecting) the desired video content by a user, to be displayed in the display unit 15, and searches for the video content based on the user's instruction acquired via the operation unit 16. The search control unit 14 includes at least a content view control unit 21 and a relation view control unit 22.

The content view control unit 21 performs the control of causing the content view in which the statistic information of a character appearing in the video content can be seen, to be displayed on the display unit 15, regarding the video content stored in the content DB 13A.

The relation view control unit 22 performs the control of causing the relationship view in which the character-relation information of a character appearing in the video content can be seen, to be displayed on the display unit 15, regarding the video content stored in the content DB 13A.

The display unit 15 displays the screens of the content view and the relationship view and the like, based on the control of the search control unit 14.

The operation unit 16 receives the user's operation and supplies an operation signal corresponding to the user's operation to the search control unit 14, based on the screens displayed on the display unit 15.

The image processing apparatus 1 is configured as described above.

The function of each block in the image processing apparatus 1 may be realized by being shared by two or more devices such as a mobile device or a server apparatus (cloud server). The function of each apparatus in a case where the function of image processing apparatus 1 is realized by being shared by two or more devices can be optionally determined.

Example of Displaying Content View

Figure 2:
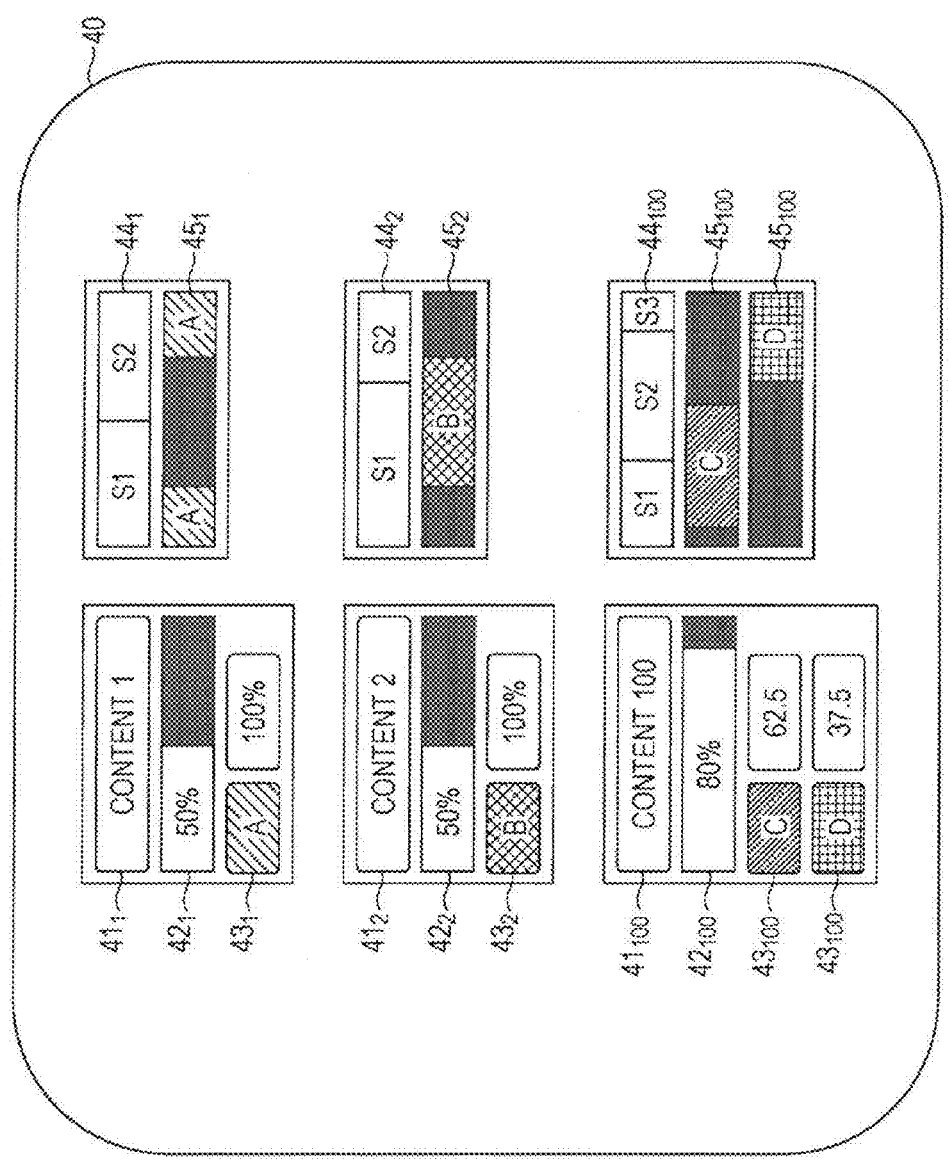
FIG. 2 is a diagram illustrating an example of a content view.

FIG. 2 illustrates an example of the content view which is caused to be displayed on the display unit 15 by the content view control unit 21.

In the content view 40 in FIG. 2, regarding one or more video content stored the content DB 13A, a content name 41, a character appearance rate 42, appearance rate of each character 43, scene configuration information 44, and an appearance pattern of each character 45 are displayed for each video content. Subscripts of right under the sign of each item in FIG. 2 are the identification code of the video content.

The content name 41 is a name of video content. The character appearance rate 42 indicates a rate of scenes in which the character is appearing in the video content. The appearance rate of each character 43 indicates the appearance rate of each character among the scene where characters are appearing. The scene configuration information 44 is information that indicates the scene configuration based on information of a scene change point in which the scene is changed in the video content. The appearance pattern of each character 45 is time-series data that indicates a place (image) where each character is appearing among the video content.

For example, the content name $41_1$ indicates that the name of video content thereof is "Content 1". The character appearance rate 42, indicates that the appearance rate of characters is 50% in the entire video content of "Content 1". The appearance rate of the character $43_1$ indicates that 100% of the scenes where characters are appearing, are the scenes of Mr. A.

In addition, the scene configuration information $44_1$ indicates that the video content of "Content 1" is configured in a unit of two scenes such as scene 1 (S1) and scene 2 (S2). The appearance pattern $45_1$ of the character indicates that Mr. A is appearing in the first half of the scene 1 and the second half of the scene 2.

The content name $41_2$ indicates that the name of video content thereof is "Content 2". The character appearance rate $42_2$ indicates that the appearance rate of characters is 50% in the entire video content of "Content 2". The appearance rate of the character $43_2$ indicates that 100% of the scenes where the characters are appearing, are the scenes of Mr. B.

In addition, the scene configuration information $44_2$ indicates that the video content of "Content 2" is configured in a unit of two scenes such as scene 1 (S1) and scene 2 (S2).

The appearance pattern $45_2$ of the character indicates that Mr. B is appearing in the second half of the scene 1 and the first half of the scene 2.

The content name $41_{100}$ indicates that the name of video content thereof is "content 100". The character appearance rate $42_{100}$ indicates that the appearance rate of characters is 80% in the entire video content of "content 100". The appearance rate of the character $43_{100}$ indicates that 62.5% of the scenes where the characters are appearing are the scenes of Mr. C and 37.5% of the same are the scenes of Mr. D.

In addition, the scene configuration information $44_{100}$ indicates that the video content of "content 100" is configured in a unit of three scenes such as scene 1 (S1) and scene 2 (S2), and scene 3 (S3). The appearance pattern $45_{100}$ of the character indicates that Mr. C is appearing from the middle of the scene 1 to the middle of the scene 2, and Mr. D is appearing from the second half of the scene 2 where Mr. C disappears, to the end of scene 3.

Example of Displaying Relationship View

Figure 3:
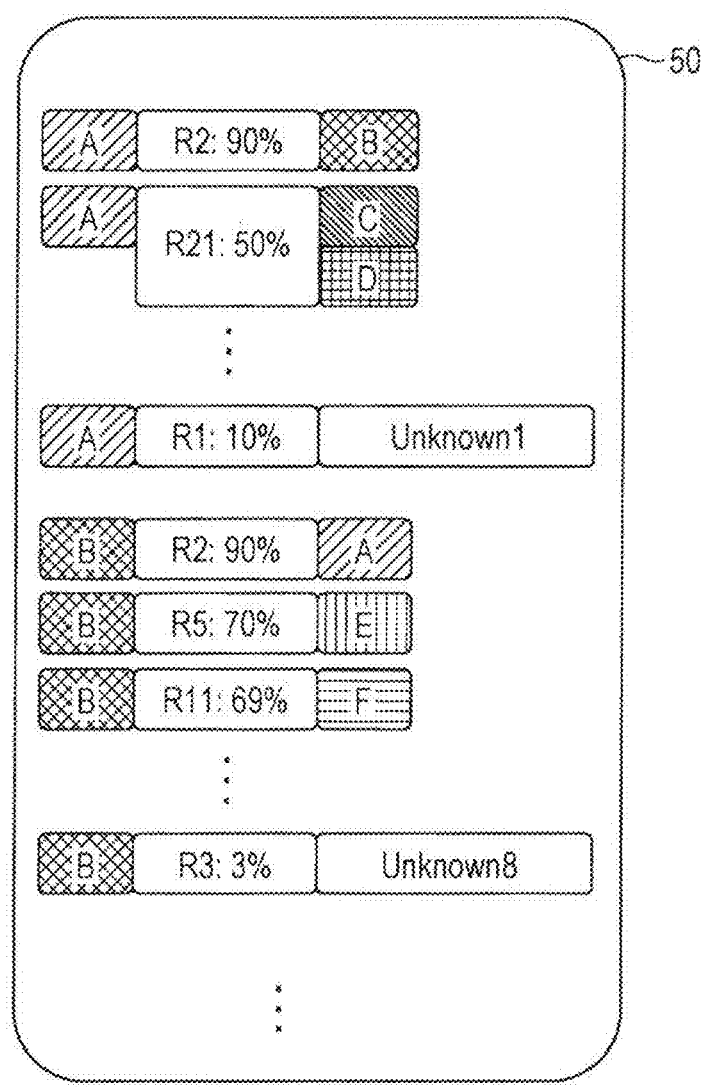
FIG. 3 is a diagram illustrating an example of a relationship view.

FIG. 3 illustrates an example of the relationship view which is caused to be displayed on the display unit 15 by the relation view control unit 22.

In the relationship view 50 in FIG. 3, for example, the character-relation information for each character appearing on the video content stored in the content DB 13A is displayed. Here, the character-relation information is information indicated as a rate whether or not the characters are appearing at the same time in the same video content or in the same scene as the relationship information. For example, in a case where the specific two characters are appearing in the same video content or in the same scene at the same time, the rate as the character-relation information of the two characters is high.

At the top of relationship view 50, the character-relation information of Mr. A is illustrated.

That is, the relationship information R2 indicates that there is video content in which Mr. A and Mr. B have a relationship with a relationship degree of 90%, among the video content stored in the content DB 13A. In addition, the relationship information R21 indicates that there is video content in which Mr. A has a relationship with a relationship degree of 50% with Mr. C and Mr. D respectively, among the video content stored in the content DB 13A. The relationship information R1 indicates that there is video content in which Mr. A has a relationship with a relationship degree of 10% with Mr. "Unknown 1", among the video content stored in the content DB 13A.

Here, Mr. A, Mr. B, Mr. C, and Mr. D are each of the characters' name whose individuals are specified by a face image recognition unit 63A described below. In the face image recognition unit 63A, in a case where characters are recognized (classified) as other characters who are not registered, they are sequentially named as "Unknown 1", "Unknown 2", . . . , and are displayed.

Next to the character-relation information of Mr. A, the character-relation information of Mr. B is displayed.

That is, the relationship information R2 indicates that there is video content in which Mr. A and Mr. B have a relationship with a relationship degree of 90%, among the video content stored in the content DB 13A. The relationship information R2 is the same relationship information R2 of above described Mr. A's, at the top of FIG. 3, and is displayed in perspective from Mr. B's.

The relationship information R5 indicates that there is video content in which Mr. B and Mr. E have a relationship with a relationship degree of 70% among the video content stored in the content DB 13A. The relationship information R11 indicates that there is video content in which Mr. B and Mr. F have a relationship with a relationship degree of 69%, among the video content stored in the content DB 13A. The relationship information R3 indicates that there is video content in which Mr. B has a relationship with a relationship degree of 3% with Mr. "Unknown 8", among the video content stored in the content DB 13A.

In this way, in the relationship view 50, for each character appearing in the video content stored in the content DB 13A, the character-relation information is displayed in a predetermined order such as descending order of the relationship degrees.

Conceptual Diagram of Processing

Figure 4:
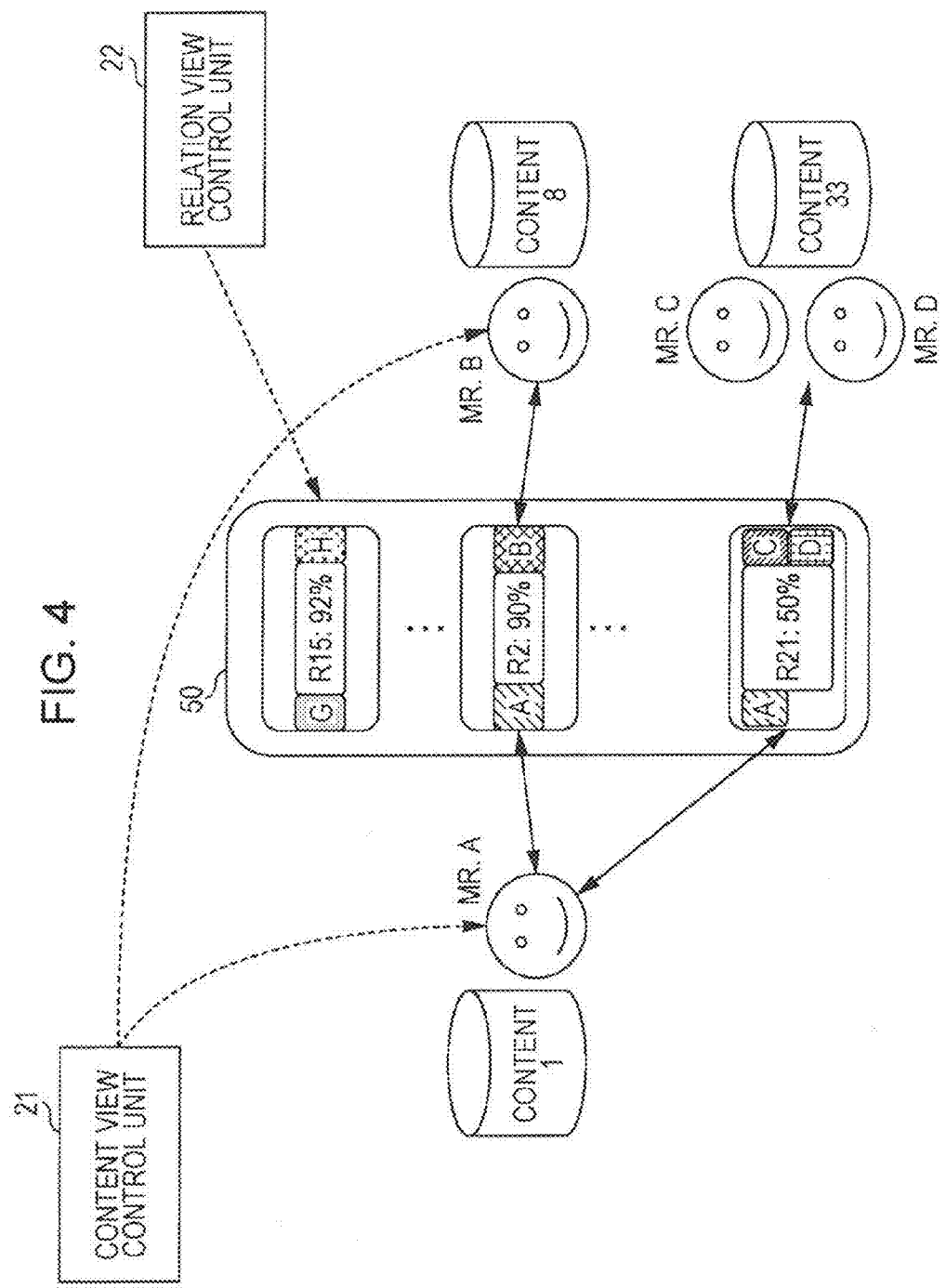
FIG. 4 is a diagram describing a concept of the content view and the relationship view.

FIG. 4 is a diagram describing a concept of the content view 40 and the relationship view 50.

By the content view 40 displayed by the content view control unit 21, it is possible to see the statistic information of the characters appearing in the video content, such information that who is appearing in what video content and in how much proportion.

Therefore, according to the content view 40, for example, as illustrated in FIG. 4, it can be seen that there is the video content 1 in which Mr. A is appearing (content name "Content 1") among the video content stored in the content DB 13A. In addition, it can be seen that there is the video content 8 in which Mr. B is appearing (content name "Content 8") and the video content 33 in which Mr. C and Mr. D are appearing (content name "Content 33").

On the other hand, by the relationship view 50 displayed by the relation view control unit 22, it is possible to see the relationship between the characters in the video content.

For example, by the relationship information R2 in the relationship view 50 illustrated in FIG. 4, it can be seen that there is video content in which Mr. A and Mr. B have a relationship with a relationship degree of 90% among the video content stored in the content DB 13A. The relationship information R2 which indicates the relationship between Mr. A and Mr. B is character-relation information based on the characters in the video content 1 and the video content 8. In the relationship information R2, the video content 1 and the video content 8 are linked.

In addition, for example, by the relationship information R21 of the relationship view 50, it can be seen that there is video content in which Mr. A, Mr. C, and Mr. D have relationships with relationship degrees of 50% among the video content stored in the content DB 13A. The relationship information R21 is character-relation information based on the characters in the video content 1 and the video content 33. In the relationship information R21, the video content 1 and the video content 33 are linked.

Example of Configuration of Meta Data Generation Unit 12 in Detail

Figure 5:
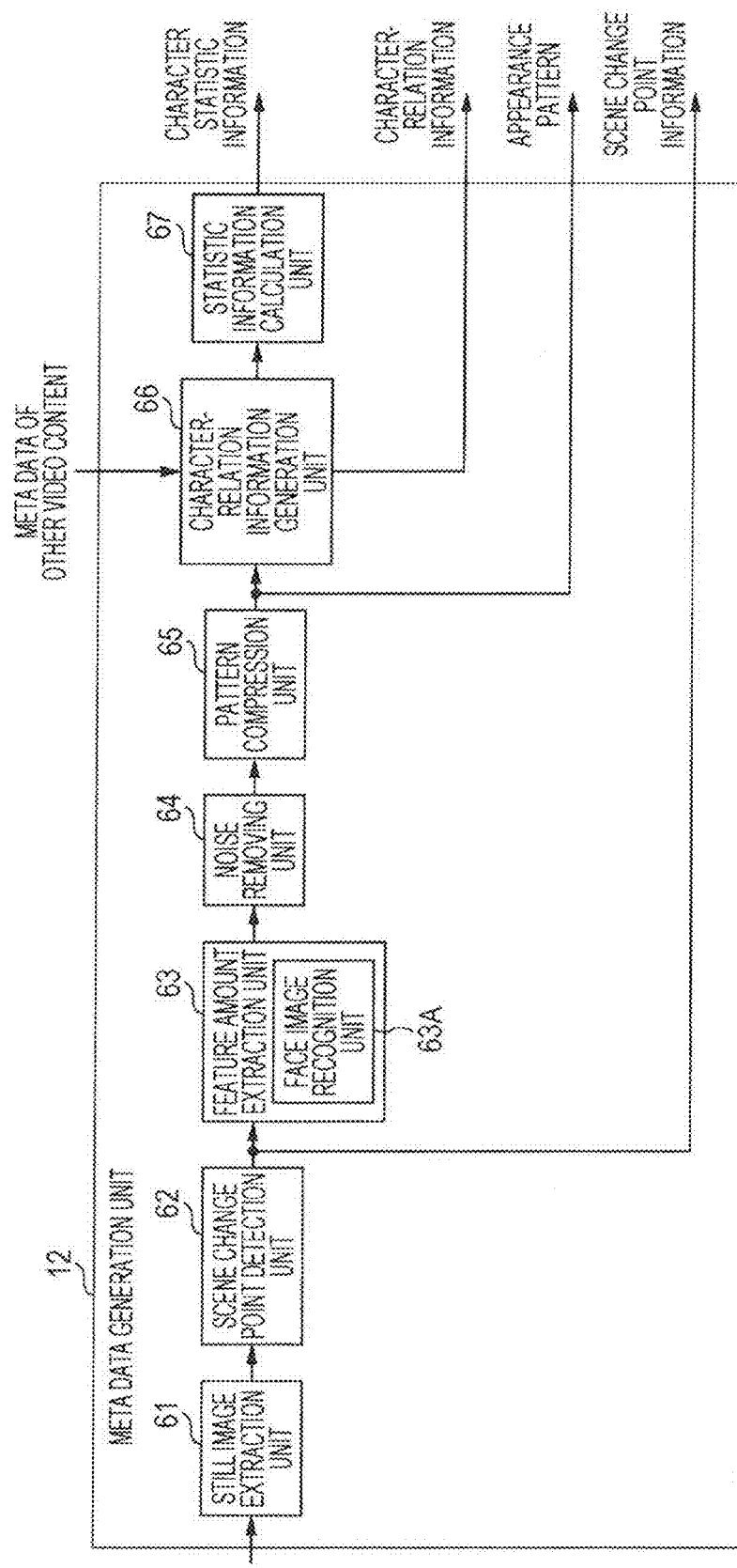
FIG. 5 is a diagram illustrating a detailed structure of meta data generation unit.

A meta data generation of the video content will be described with reference to FIG. 5. FIG. 5 illustrates a detailed configuration of the meta data generation unit 12.

The meta data generation unit 12 is configured to include a still image extraction unit 61, a scene change point detection unit 62, a feature amount extraction unit 63, a noise removing unit 64, a pattern compression unit 65, a character-relation information generation unit 66, and a statistic information calculation unit 67.

The still image extraction unit 61 extracts still images for a constant time interval such as one second from a plurality of still images forming the video content to generate the time-series data formed by the plurality of still images in which the video contents are summarized. Hereinafter, the time-series data of the plurality of extracted still images will be referred to as still image time-series data.

The scene change point detection unit 62 detects a scene change point from the still image time-series data. The scene change point is a point where the scene is changed among the continuing still images. Since a difference (change) in brightness of the still images is large before and after the points, the scene change point can be detected by detecting such differences in brightness. For example, a point of changing from commercial to main title of the program or a point of changing from a scene of night time to a scene of daytime is detected as a scene change point. Since the change of scenes depends upon a detail of the video content, the interval of detecting the change of scenes is different for each video content. In the detection of the scene change point, any existing technology for detecting the scene change point may be adopted.

The scene change point detection unit 62 generates scene change point information which indicates the detected scene change points, and supplies to the meta data DB 13B in the storage unit 13 to be stored therein.

The feature amount extraction unit 63 extracts the appearance pattern which is a time-series pattern indicating a character's appearing in the still image time-series data, as a feature amount of the video content. The feature amount extraction unit 63 includes therein a face image recognition unit 63A which identifies a character (individual) by recognizing the face image in the images. In the feature amount extraction unit 63, the appearance patterns are generated for each character appearing in the still images.

For example, in a case where the still image time-series data of the video content 1 (Content 1) is formed of five images, and Mr. A is not reflected in the first two images and is reflected in the next three images, the images in which Mr. A is reflected are represented as "1" and in which Mr. A is not reflected are represented as "0". Then, the appearance pattern of Mr. A is generated as A of Content 1={0, 0, 1, 1, 1}

In the face image recognition unit 63A, a face image for specifying an individual is registered in advance.

In the feature amount extraction unit 63, it is sufficient if the character is recognized and the time-series data can be generated, which indicates the appearance or non-appearance for each character. Accordingly, the method of recognizing the character is not limited to the face image recognition technology. For example, the character may be recognized using a speaker recognition technology.

The noise removing unit 64 performs a noise removing process for removing the noise in the appearance pattern of each character generated in the feature amount extraction unit 63. The noise removing process will be described below in detail with reference to FIG. 7 and FIG. 8.

The pattern compression unit 65 performs a compression process of the appearance pattern the noise of which is removed, and supplies the processed appearance pattern to the character-relation information generation unit 66, and also supplies the processed appearance pattern to the meta data DB 13B to be stored therein. The pattern compression process will be described below in detail with reference to FIG. 9 and FIG. 10.

The configuration of the noise removing unit 64 and the pattern compression unit 65 may be omitted. Alternately, by providing a setting screen on which the on-and-off of the performing of the noise removing process and the pattern compression process may be set, the performing of the process of the noise removing unit 64 and the pattern compression unit 65 may be controlled based on the set value.

The character-relation information generation unit 66 generates the character-relation information for displaying the relationship information of the relationship view, and supplies to the meta data DB 13B to be stored therein. The method of generating the character-relation information will be described below.

In addition, the character-relation information generation unit 66 supplies the appearance patterns of the characters supplied from the pattern compression unit 65 to the statistic information calculation unit 67 for generating the character statistic information.

The statistic information calculation unit 67 generates the character statistic information based on the appearance patterns of the characters supplied from the character-relation information generation unit 66, and supplies to the meta data DB 13B to be stored therein. Specifically, the statistic information calculation unit 67 calculates the character appearance rate which is a rate of a character's appearing in the still image time-series data of the video content and the appearance rate (appearance frequency) for each character, and supplies the character appearance rate to the storage unit 13 to be stored as the character statistic information. For example, in the 60 still image time-series data, in a case where Mr. A appears in 15 still images and Mr. B appears in 5 still images, the character appearance rate is $20/60=33\%$, and the appearance rate of Mr. A is $15/20=75\%$, the appearance rate of Mr. B is $5/20=25\%$.

Processing of Feature Amount Extraction Unit 63

Next, the generation of the appearance pattern by the feature amount extraction unit 63 will be described with reference to FIG. 6.

Figure 6:
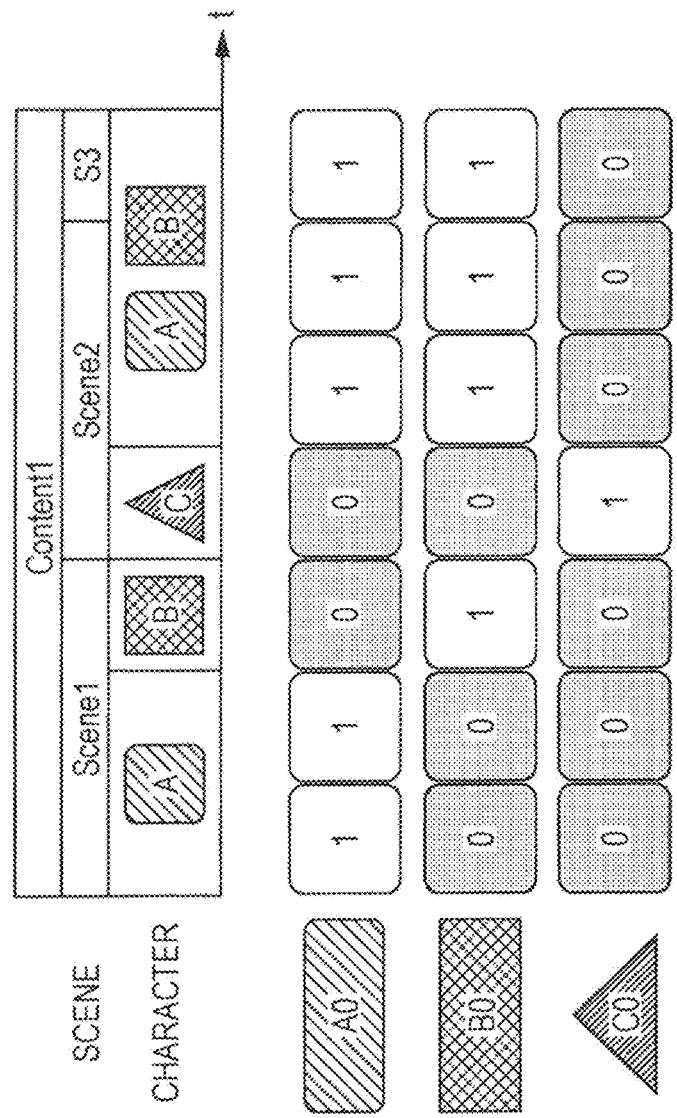
FIG. 6 is a diagram describing an appearance pattern generation.

For example, it is assumed that there is the still image time-series data of the video content 1 as illustrated in FIG. 6.

That is, the still image time-series data of the video content 1 is configured to have three scene units of scene 1, 2, and 3. In addition, the still image time-series data of the video content 1 is configured to have seven still images. The first three still images belong to the scene 1, next three belong to the scene 2, and only the last one (the seventh) belongs to the scene 3.

Then, in the still image time-series data of the video content 1, three characters of Mr. A, Mr. B, and Mr. C are appearing. More specifically, in the first two still images, Mr. A is appearing, in the third still image, Mr. B is appearing, in the fourth still image, Mr. C is appearing, and the fifth to seventh still images, two characters of Mr. A and Mr. B are appearing.

With respect to such the still image time-series data of the video content 1, the feature amount extraction unit 63 generates the Mr. As appearance pattern A0 of Content 1, Mr. B's appearance pattern B0 of Content 1, and Mr. C's appearance pattern C0 of Content 1 are as follows.

A0 of Content 1={1, 1, 0, 0, 1, 1, 1}
B0 of Content 1={0, 0, 1, 0, 1, 1, 1}
C0 of Content 1={0, 0, 0, 1, 0, 0, 0}

Processing of Noise Removing Unit 64

If the scenes of the video content are rapidly changed, the appearance pattern is also changed finely. However, there is a case where such fine changes may be considered as noises from the view point of entire flow of the video content.

Therefore, by the noise removing process, it is possible to remove such fine changes, and to roughly express the video content.

Figure 7:
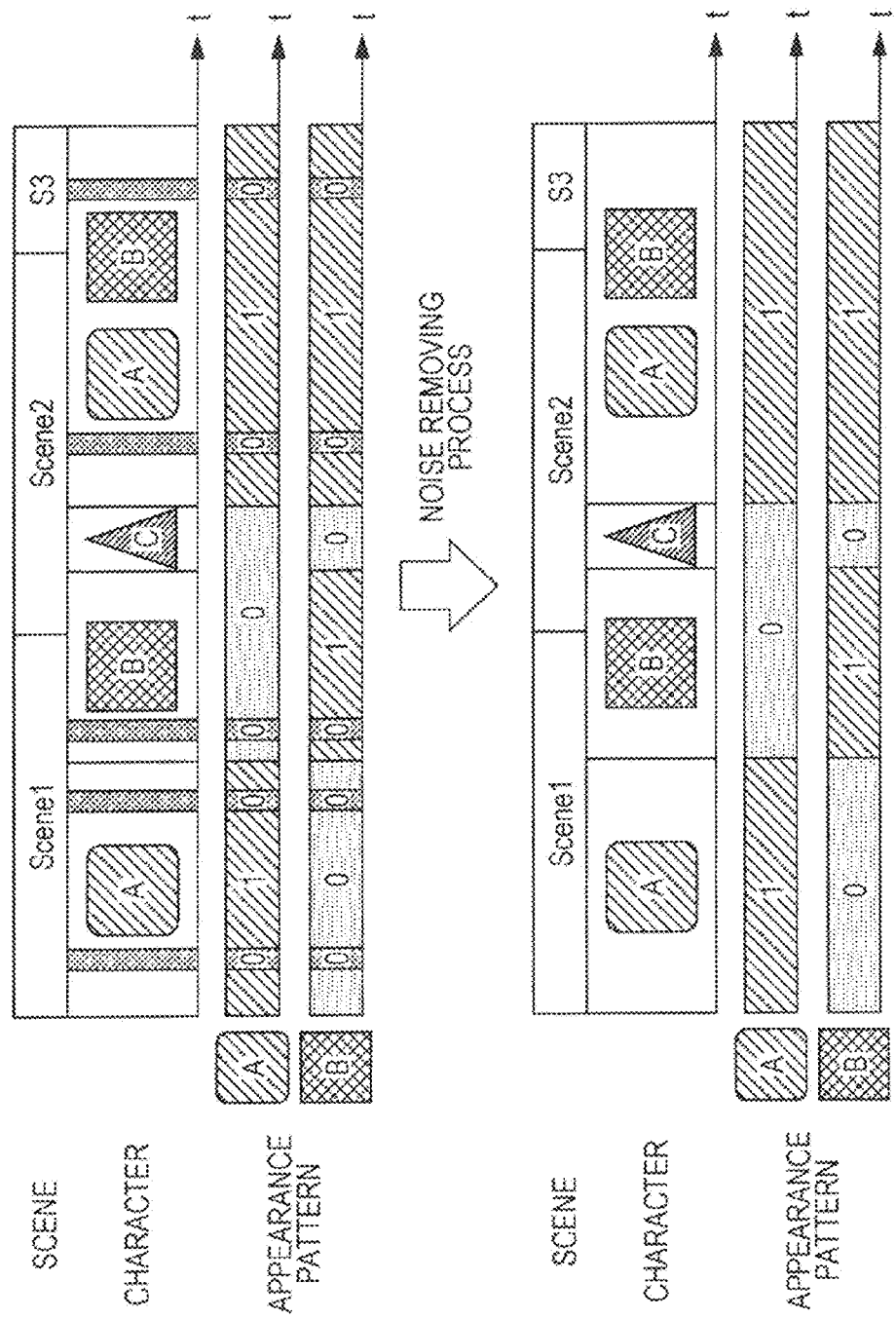
FIG. 7 is a diagram describing a noise removing process.

FIG. 7 illustrates an example of the noise removing process of the noise removing unit 64. The upper diagram in FIG. 7 illustrates the still image time-series data of the video content before the noise removing process and the appearance pattern thereof, and the lower diagram in FIG. 7 illustrates the still image time-series data of the video content after the noise removing process and the appearance pattern thereof.

For example, the scene 1 of the video content before the noise removing process represents the state that "first half of the scene starts with Mr. A, and after two seconds and eight seconds, Mr. A disappears for a moment. In the latter half of the scene, Mr. B substitutes Mr. A, and Mr. B disappears one second after the appearance for a moment".

The scene 1 of the video content after the noise removing process is represented and summarized as "first half of the scene starts with Mr. A, and in the latter half of the scene, Mr. B appears". In this way, in the noise removing process, the fine change of the appearance pattern of the video content can be omitted and the video content can roughly be expressed and summarized.

Figure 8:
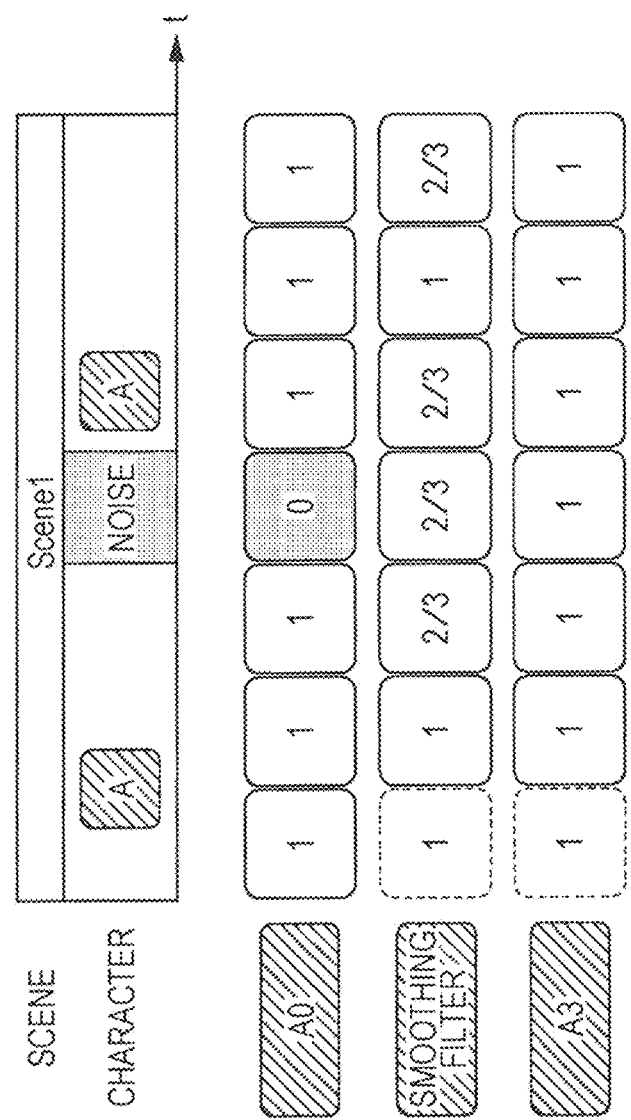
FIG. 8 is a diagram describing a noise removing process.

FIG. 8 illustrates a specific method of processing the noise removing process.

In the noise removing process, a smoothing filter can be used. In FIG. 8, an example of noise removing process is illustrated, in a case where the number of filter tap is "three" with respect to the appearance pattern A0 of the scene 1 in the video content.

With respect to the appearance pattern A0, by performing the smoothing filter process with the number of filter tap "three" and by rounding off the result data thereafter, the appearance pattern A3 after the noise removing process can be obtained.

Processing of Pattern Compression Unit 65

Next, the pattern compression process by the pattern compression unit 65 will be described with reference to FIG. 9 and FIG. 10.

In the pattern compression process, there is a method in which the appearance pattern is separated in a scene unit and compressed, and a method in which the appearance pattern is not separated in a scene unit and compressed.

Figure 9:
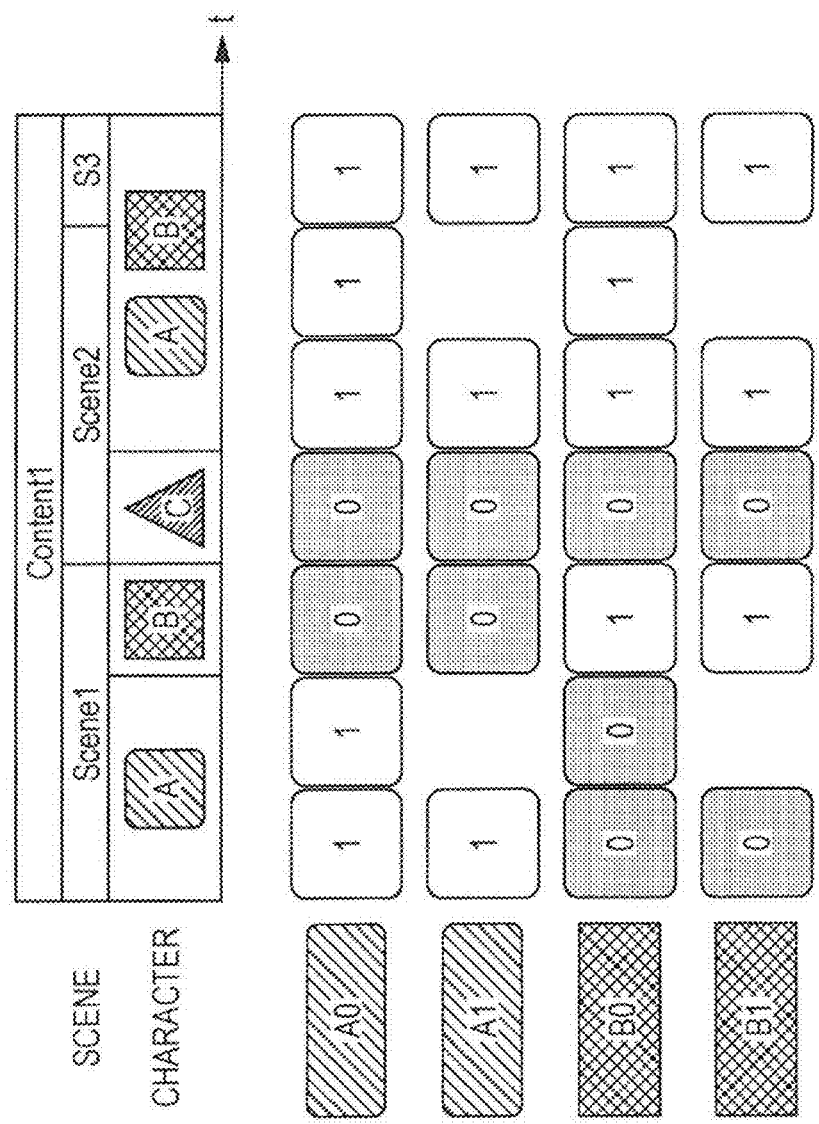
FIG. 9 is a diagram describing a pattern compression process.

FIG. 9 illustrates the appearance patterns A1 and B1 after the compression process with the appearance pattern being separated in a scene unit, with respect to the appearance patterns A0 and B0 of the video content 1 in FIG. 6.

In the compression process, in a case where a value is followed by the same value in the appearance pattern, the second value and the values thereafter are removed. However, in the compression process with the appearance pattern being separated in a scene unit, even in a case where a value is followed by the same value, the values at the time when the scene is changed are not removed.

Accordingly, the appearance patterns A1 and B1 of the video content 1 after the compression process of the appearance patterns A0 and B0 are as follows.

A1 of Content 1={1, 0, 0, 1, 1}
B1 of Content 1={0, 1, 0, 1, 1}

Figure 10:
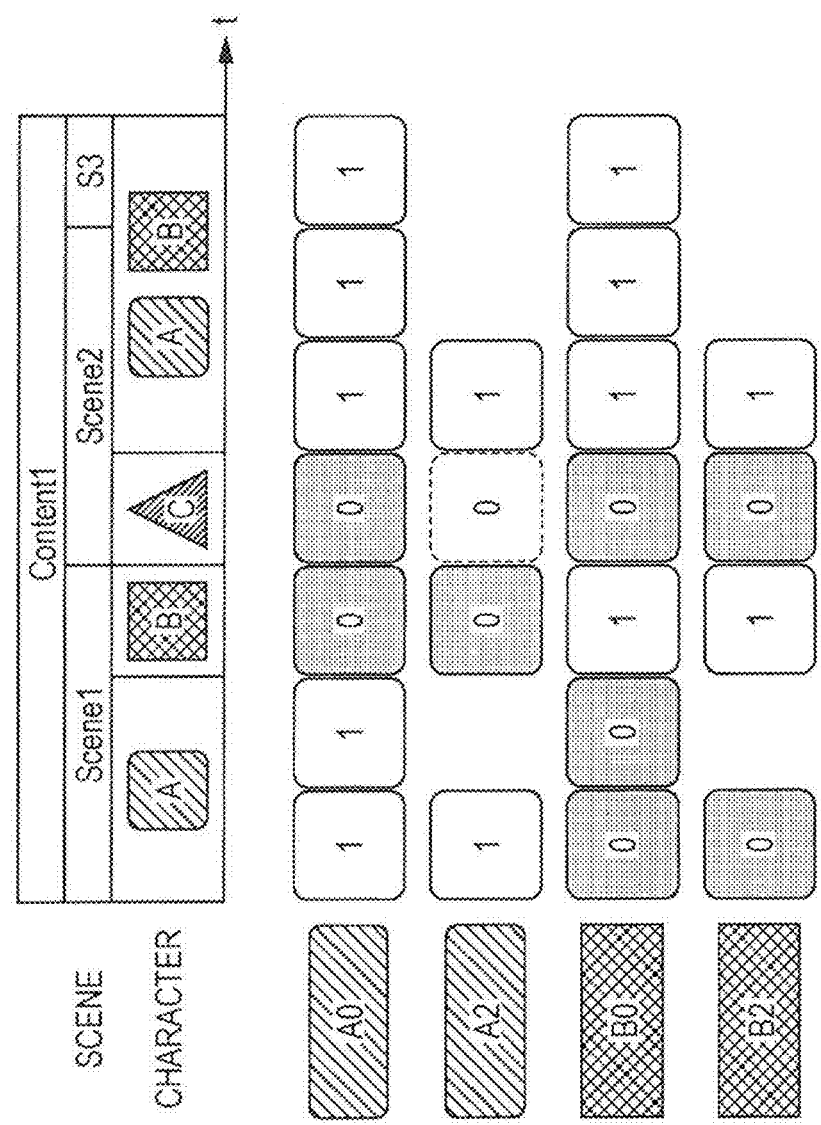
FIG. 10 is a diagram describing a pattern compression process.

FIG. 10 illustrates the appearance patterns A2 and B2 after the compression process with the appearance pattern not being separated in a scene unit, with respect to the appearance patterns A0 and B0 of the video content 1 in FIG. 6. The appearance patterns A2 and B2 of the video content 1 after the compression process with the appearance pattern not being separated in a scene unit, are as follows.

A2 of Content 1={1, 0, 1}
B2 of Content 1={0, 1, 0, 1}

In case of the compression process with the appearance pattern not being separated in a scene unit, the numbers of data in the appearance patterns A2 and B2 of the video content 1 after the compression process are different. However, in a case where the character-relation information and character statistic information are generated by the character-relation information generation unit 66 and the statistic information calculation unit 67, it is preferable that the numbers of data for each character are aligned. Therefore, in a case where the numbers of data for each character are different, the pattern compression unit 65 performs a process of matching the number of data of the appearance pattern having a small number of data to the appearance pattern having a large number of data. Specifically, the pattern compression unit 65, as illustrated by a dotted line FIG. 10, matches the number of data of the appearance pattern A2 to the number of data of the appearance pattern B2 by inserting the value ("0") before the compression process in the position where the element of the appearance pattern A2 is absent with respect to the appearance pattern B2.

A2 of Content 1={1, 0, 1}→{1, 0, 0, 1}

Processing of Character-Relation Information Generation Unit 66

Next, the processing of the character-relation information generation unit 66 will be described with reference to FIG. 11 to FIG. 14.

Figure 12:
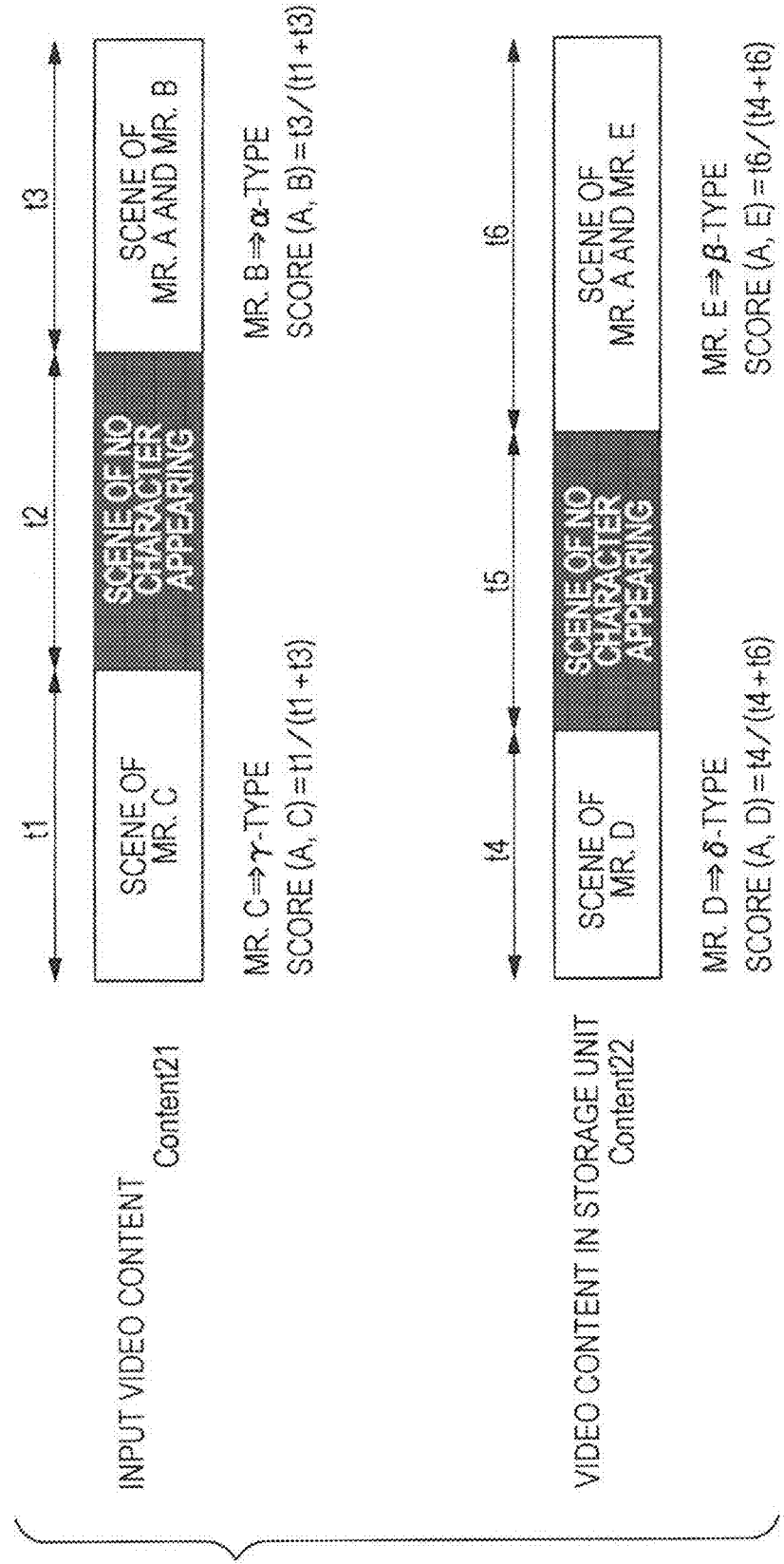
FIG. 12 is a diagram describing a processing of the character-relation information generation unit.

The character-relation information generation unit 66 focuses on each character appearing in the video content supplied from the image acquiring unit 11, and detects another character related to the focused character. Then, the character-relation information generation unit 66 classifies another character related to the focused character into any of the four types such as α-type, β-type, γ-type, and δ-type.

α-type, β-type, γ-type, and δ-type are defined as below.

α-type: a character appearing with the focused character in the same scene in the same video content β-type: a character appearing in the same scene with the focused character in the other video content γ-type: a character appearing in the scene other than the scene where the focused character is appearing in the same video content δ-type: a character appearing in the scene other than the scene where the focused character is appearing in the other video content For example, the video content 21 illustrated in FIG. 12 is assumed to be supplied from the image acquiring unit 11. The video content 21 is the content that is formed of a scene in which Mr. C is appearing during the first t1 of the content, a scene in which no character is appearing during next t2, and a scene in which Mr. A and Mr. B are further appearing during t3 at the same time.

In addition, the video content 22 illustrated in FIG. 12 is assumed to be stored in the storage unit 13. The video content 22 is content that is formed of a scene in which Mr. D is appearing during the first t4 of the content, a scene in which no character is appearing during next t5, and a scene in which Mr. A and Mr. E are further appearing during t6 at the same time.

In the case, when Mr. A in the video content 21 is focused on, Mr. B is classified into α-type, Mr. C is classified into γ-type, Mr. E is classified into β-type, and Mr. D is classified into δ-type.

Figure 11:
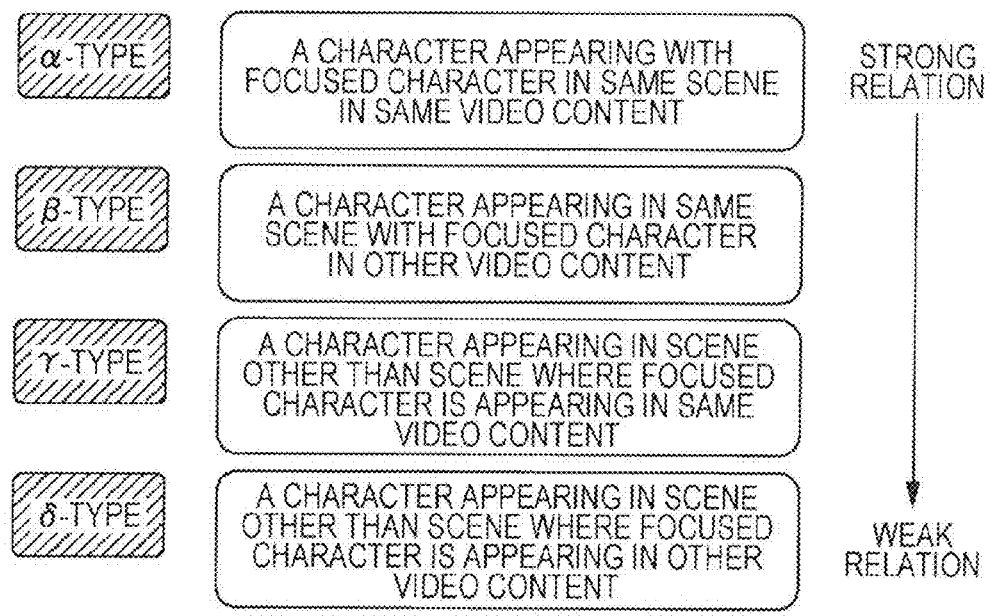
FIG. 11 is a diagram describing a processing of a character-relation information generation unit.

Next, the character-relation information generation unit 66 calculates the relationship degree according to the types in which the other character related to the focused character is classified, such that the relationship is intensive in an order of α-type, β-type, γ-type, and δ-type as illustrated in FIG. 11.

First, the character-relation information generation unit 66 scores the character related to the focused character according to the appearing time. As illustrated in FIG. 12, the score of Mr. A and Mr. B, SCORE (A, B) is calculated by t3/(t1+t3). The score of Mr. A and Mr. C, SCORE (A, C) is calculated by t1/(t1+t3). Similarly, the score of Mr. A and Mr. E, SCORE (A, E) is calculated by t6/(t4+t6), and the score of Mr. A and Mr. D, SCORE (A, D) is calculated by t4/(t4+t6).

Next, the character-relation information generation unit 66 calculates the relationship degree by multiplying the relationship degree coefficient K which is set such that the relationship is intensive in an order of α-type, β-type, γ-type, and δ-type to the calculated scores.

Figure 13:
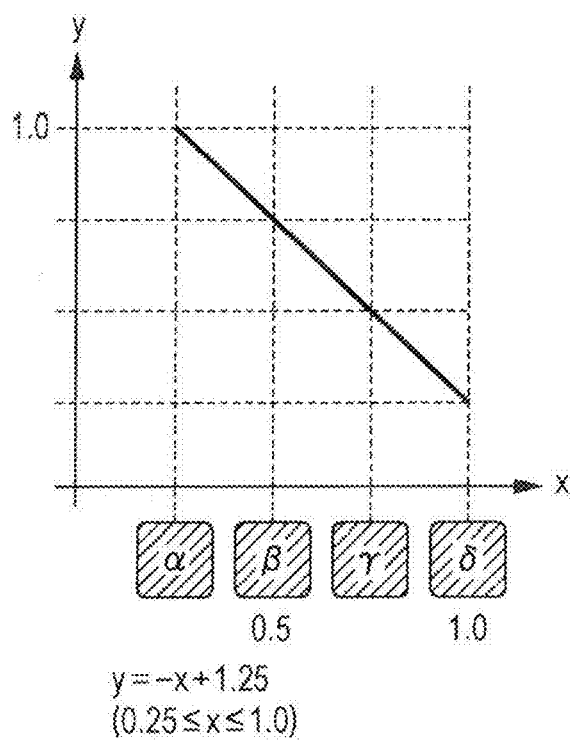
FIG. 13 is a diagram describing a processing of the character-relation information generation unit.

The relationship degree coefficient K is set as illustrated in FIG. 13, for example, a relationship degree coefficient of α-type, $K_\alpha=1.0$, a relationship degree coefficient of β-type, $K_\beta=0.75$, a relationship degree coefficient of γ-type, $K_\gamma=0.5$, and a relationship degree coefficient of δ-type, $K_\delta=0.25$.

Therefore, the relationship degree between Mr. A and Mr. B, R (A, B) is calculated as follows.

$$R(A,B)=\text{SCORE}(A,B) \times K_\alpha \times 100\% = \text{SCORE}(A,B) \times 1.0 \times 100\%$$

Similarly, the relationship degree between Mr. A and Mr. C, R (A, C), the relationship degree between Mr. A and Mr. E, R (A, E), and the relationship degree between Mr. A and Mr. D, R (A, D) are calculated as follows.

$$R(A,C)=\text{SCORE}(A,C) \times K_\gamma \times 100\% = \text{SCORE}(A,C) \times 0.5 \times 100\%$$

$$R(A,E)=\text{SCORE}(A,E) \times K_\beta \times 100\% = \text{SCORE}(A,E) \times 0.75 \times 100\%$$

$$R(A,D)=\text{SCORE}(A,D) \times K_\delta \times 100\% = \text{SCORE}(A,D) \times 0.25 \times 100\%$$

In this way, each character appearing in the video content supplied from the image acquiring unit 11 is focused on, and the relationship degree between the focused character and the other character who is related to the focused character is calculated to be stored in the meta data DB 13B in the storage unit 13 as the character relation information.

In the example described above, the score of the focused character and the other character related to the focused character is calculated as the focused character's appearing time with respect to the total time in which the characters are appearing. However, it may be calculated as the focused character's appearing time with respect to the total time of entire video content. That is, for example with FIG. 12, the score may calculated as SCORE (A, B)=t3/(t1+t2+t3), SCORE (A, C)=t1/(t1+t2+t3), SCORE (A, E)=t6/(t4+t5+t6), and SCORE (A, D)=t4/(t4+t5+t6).

In addition, in a case where the pattern compression process is not performed, the score between the focused character and the other character related to the focused character may be calculated by counting the number of still images in which each character is appearing, not by the rate of appearing time.

In the example described above, the relationship degree coefficient K is set such that the relationship becomes more intensive when the character appearing at the same time with the focused character. However, the relationship degree coefficient K may be set to any value by the operation unit 16.

Figure 14A:
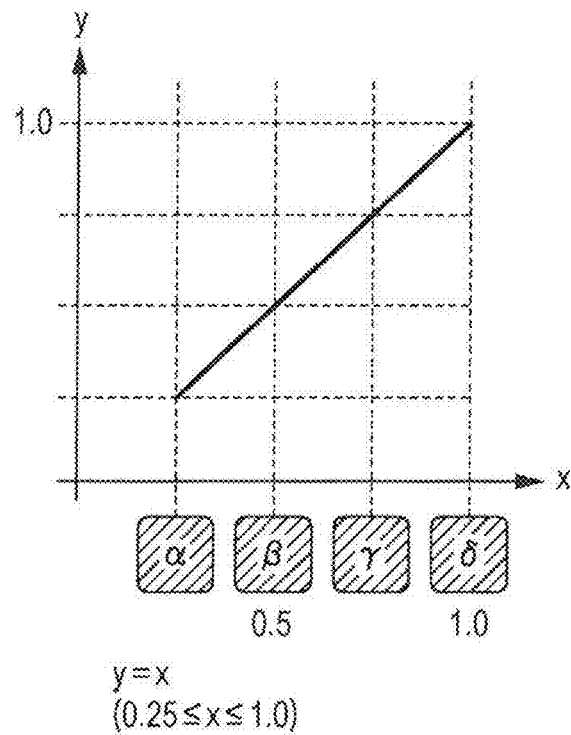
FIGS. 14A and 14B are diagrams describing a processing of the character-relation information generation unit.

For example, as illustrated in FIG. 14A, the relationship degree coefficient K can be set with emphasizing the weak relationship, such that the relationship becomes weaker when the character appearing at the same time with the focused character. In the example in FIG. 14, the relationship degree coefficients are set as; the relationship degree coefficient of α-type, $K_\alpha=0.25$, the relationship degree coefficient of β-type, $K_\beta=0.5$, the relationship degree coefficient of γ-type, $K_\gamma=0.75$, and the relationship degree coefficient of δ-type, $K_\delta=1.0$.

Figure 14B:
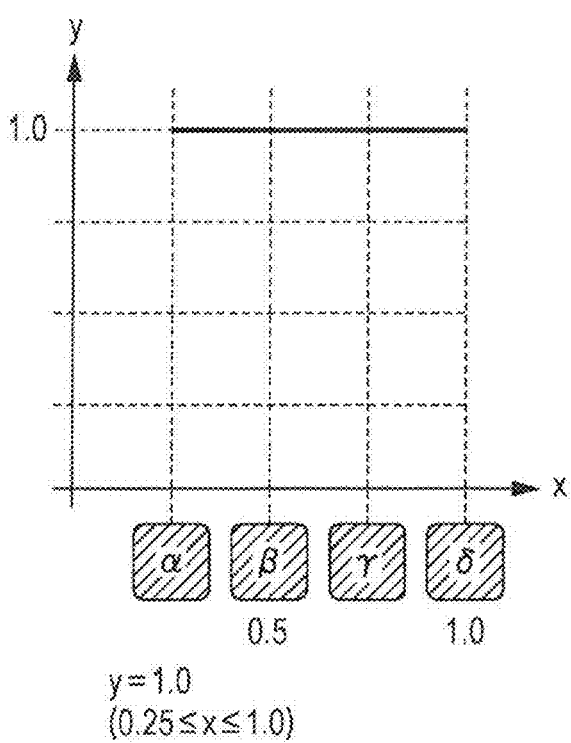

In addition, as illustrated in FIG. 14B, it is also possible to set the relationship degree according only to the appearing time by setting the relationship degree coefficient K to be constant.

Here, in a case where the relationship degree coefficient K is changed, the relationship degree is recalculated for each character in each video content.

Processing of Statistic Information Calculation Unit 67

Next, the process by the statistic information calculation unit 67 will be described.

Figure 15:
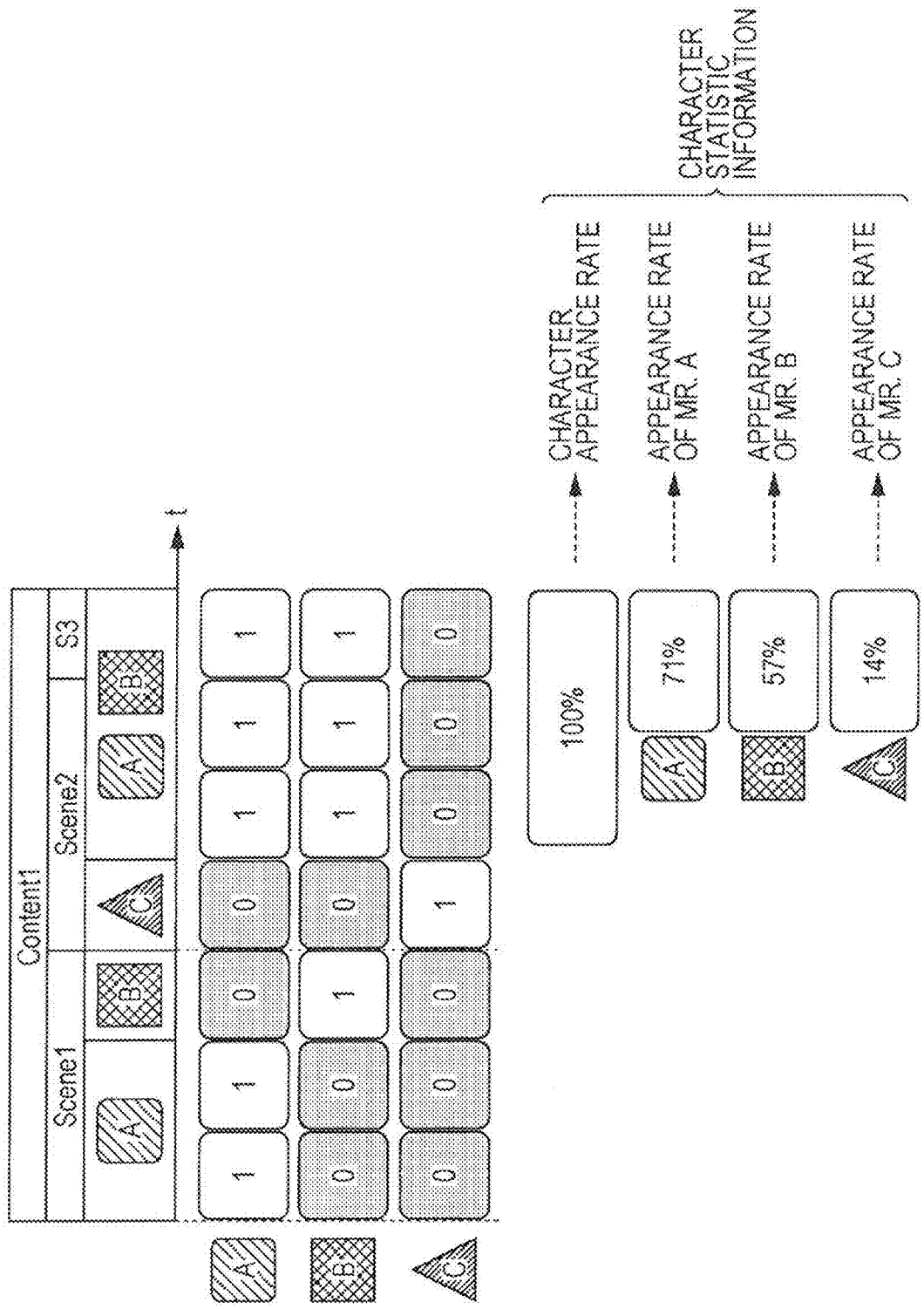
FIG. 15 is a diagram describing a processing of a statistic information calculation unit.

FIG. 15 illustrates the result of the generation of the character statistic information by the statistic information calculation unit 67 with respect to the appearance pattern in the video content 1 illustrated in FIG. 6.

The statistic information calculation unit 67 calculates the character appearance rate which is a rate of the character's appearing in the still image time-series data in the video content 1. In the example of video content 1 illustrated in FIG. 6, the character is appearing in all of the seven still images among the seven still image time-series data, thus, the character appearance rate is 7/7=100%.

In addition, the statistic information calculation unit 67 calculates the appearance rate of Mr. A. In the example of video content 1 illustrated in FIG. 6, Mr. A is appearing in five still images among seven still images in which the characters are appearing, thus, the appearance rate of Mr. A is 5/7=71%.

In addition, the statistic information calculation unit 67 calculates the appearance rate of Mr. B. In the example of video content 1 illustrated in FIG. 6, Mr. B is appearing in four still images among seven still images in which the characters are appearing, thus, the appearance rate of Mr. B is 4/7=57%.

In addition, the statistic information calculation unit 67 calculates the appearance rate of Mr. C. In the example of video content 1 illustrated in FIG. 6, Mr. C is appearing in one still image among seven still images in which the characters are appearing, thus, the appearance rate of Mr. C is 1/7=14%.

Therefore, the statistic information calculation unit 67 stores the character appearance rate=100%, the appearance rate of Mr. A=71%, the appearance rate of Mr. B=57%, and the appearance rate of Mr. C=14% in the meta data DB 13B in the storage unit 13 as the character statistic information.

In the example in FIG. 15, the character appearance rate and the appearance rate of each character are calculated by counting the number of still images using the appearance pattern on which the compression process is not performed. However, in a case where the compression process is performed on the appearance pattern, the character appearance rate and the appearance rate of each character can be calculated using the appearing time, as similar to the scores in FIG. 12.

Processing Flow of Meta Data Generation Process

Figure 16:
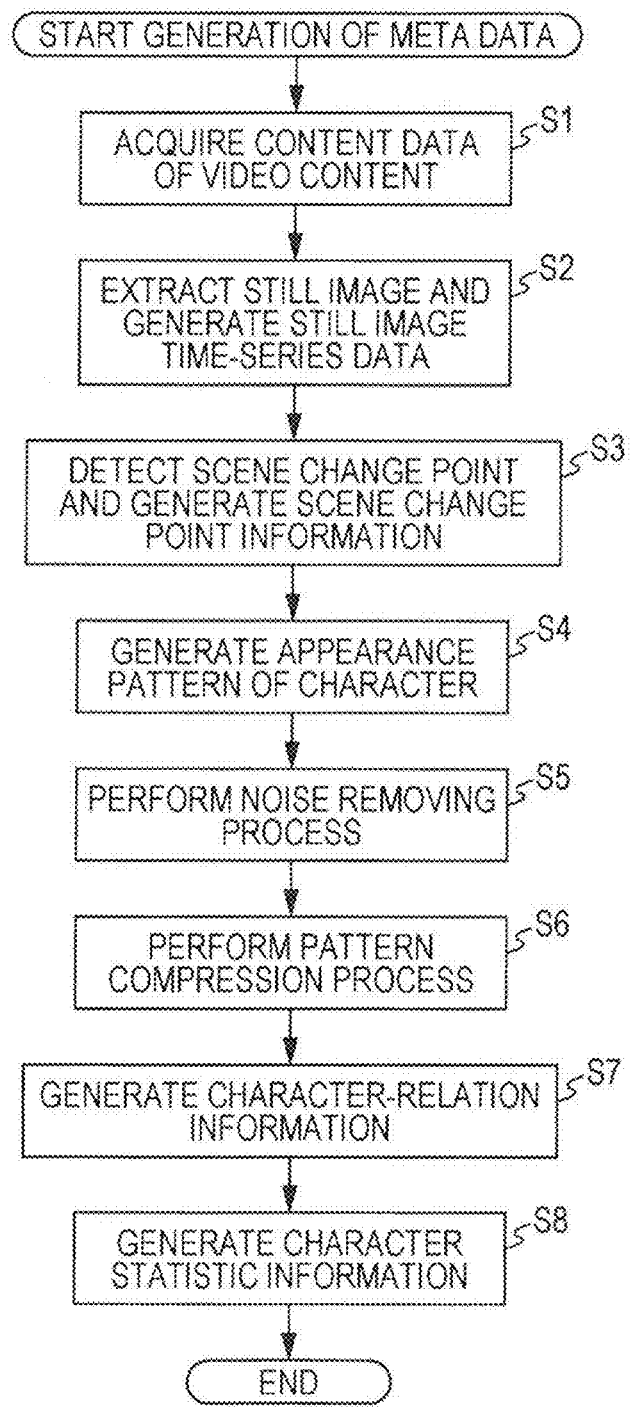
FIG. 16 is a flow chart describing a meta data generation process.

Next, the meta data generation process for generating the meta data of the video content, which is performed in a case where the video content is input to the image processing apparatus 1 with reference to the flow chart in FIG. 16 will be described.

At the beginning, in STEP S1, the image acquiring unit 11 acquires the content data of the video content, and causes the acquired content data of the video content to be stored in the content DB 13A of the storage unit 13, and also supplies the acquired content data of the video content to the meta data generation unit 12.

In STEP S2, the still image extraction unit 61 of the meta data generation unit 12 extracts the still images from the content data of the video content in a constant interval, and generates the still image time-series data that is formed of a plural number of still images in which the video content are summarized.

In STEP S3, the scene change point detection unit 62 detects the scene change point with respect to the still image time-series data to generate the scene change point information, and supplies the scene change point information to the meta data DB 13B to be stored therein.

In STEP S4, the feature amount extraction unit 63 extracts the feature amount of the video content. Specifically, the feature amount extraction unit 63 generates the appearance pattern for each character, that is the time-series data which indicates the appearance of characters in the still image time-series data. The generated appearance pattern of each character as the feature amount is supplied to the meta data DB 13B to be stored therein.

In STEP S5, the noise removing unit 64 performs the noise removing process of the appearance pattern of each character.

In STEP S6, the pattern compression unit 65 performs the pattern compression process with respect to each character's appearance pattern the noise of which is removed, and supplies the compressed appearance pattern to the meta data DB 13B to be stored therein.

The meta data generation unit 12 is preferred to store the appearance pattern of each character before performing the noise removing and the compression process in the meta data DB 13B in advance. In this way, it is possible to perform the noise removing or the compression process later, if necessary.

In STEP S7, the character-relation information generation unit 66 generates the character-relation information of each character who is appearing in the video content supplied from the image acquiring unit 11. That is, the character-relation information generation unit 66 focuses on each character appearing in the video content, and calculates the relationship degree between the focused character and the other character related to the focused character, and supplies the calculation results to the meta data DB 13B as the character-relation information, to be stored therein.

In STEP S8, the statistic information calculation unit 67 generates the character statistic information based on the appearance pattern of each character supplied from the character-relation information generation unit 66. That is, the statistic information calculation unit 67 calculates the character appearance rate and the appearance rate of each character. Then, the statistic information calculation unit 67 supplies the calculated character statistic information to the meta data DB 13B to be stored therein.

As above, the meta data generation process is ended.

First Method of Searching for Video Content

Next, a method of searching for the desired video content using the meta data of the video content stored in the meta data DB 13B will be described.

First, a first method of searching, in which searching for the video content starts with the content view 40 as a starting point, will be described.

Figure 17:
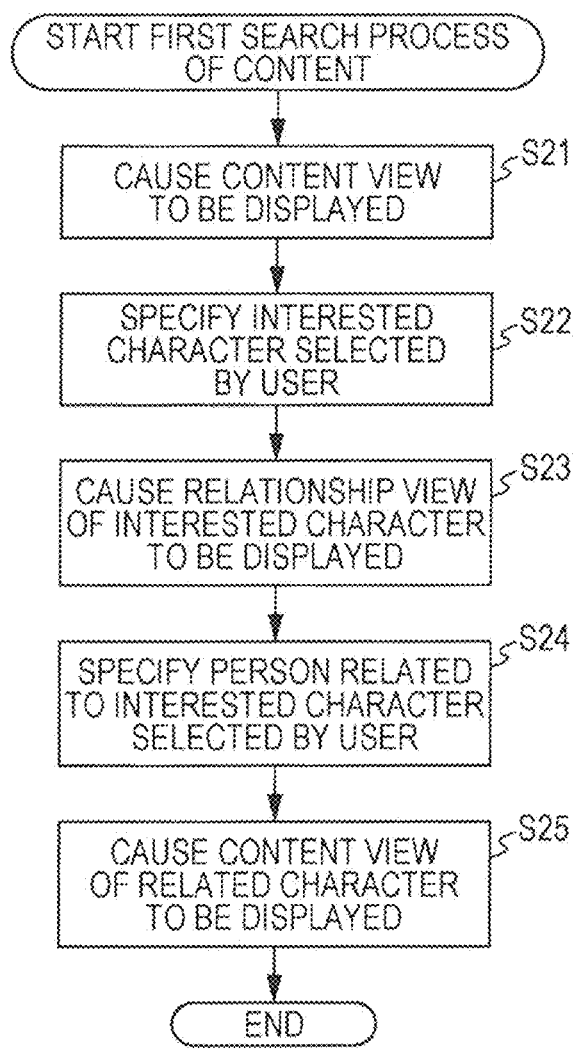
FIG. 17 is a flow chart describing a first searching process of content.

FIG. 17 illustrates a flow chart of the first searching process of the content applied to the first method of searching.

At the beginning, in STEP S21, the content view control unit 21 causes the content view 40 to be displayed on the display unit 15. For example, the content view 40 illustrated in FIG. 2 is displayed in STEP S21.

In the operation unit 16, the user performs an operation of selecting a character of interest (hereinafter, referred to as interested character) with reference to the character statistic information of the video content indicated in the content view 40. Then, the operation unit 16 specifies the interested character selected by the user, and supplies the information indicating the interested character to the relation view control unit 22 in STEP S22.

In STEP S23, the relation view control unit 22 recognizes the interested character selected by the user using the information from the operation unit 16, and causes the relationship view 50 which indicates the character-relation information of the interested character to be displayed on the display unit 15.

Figure 18:
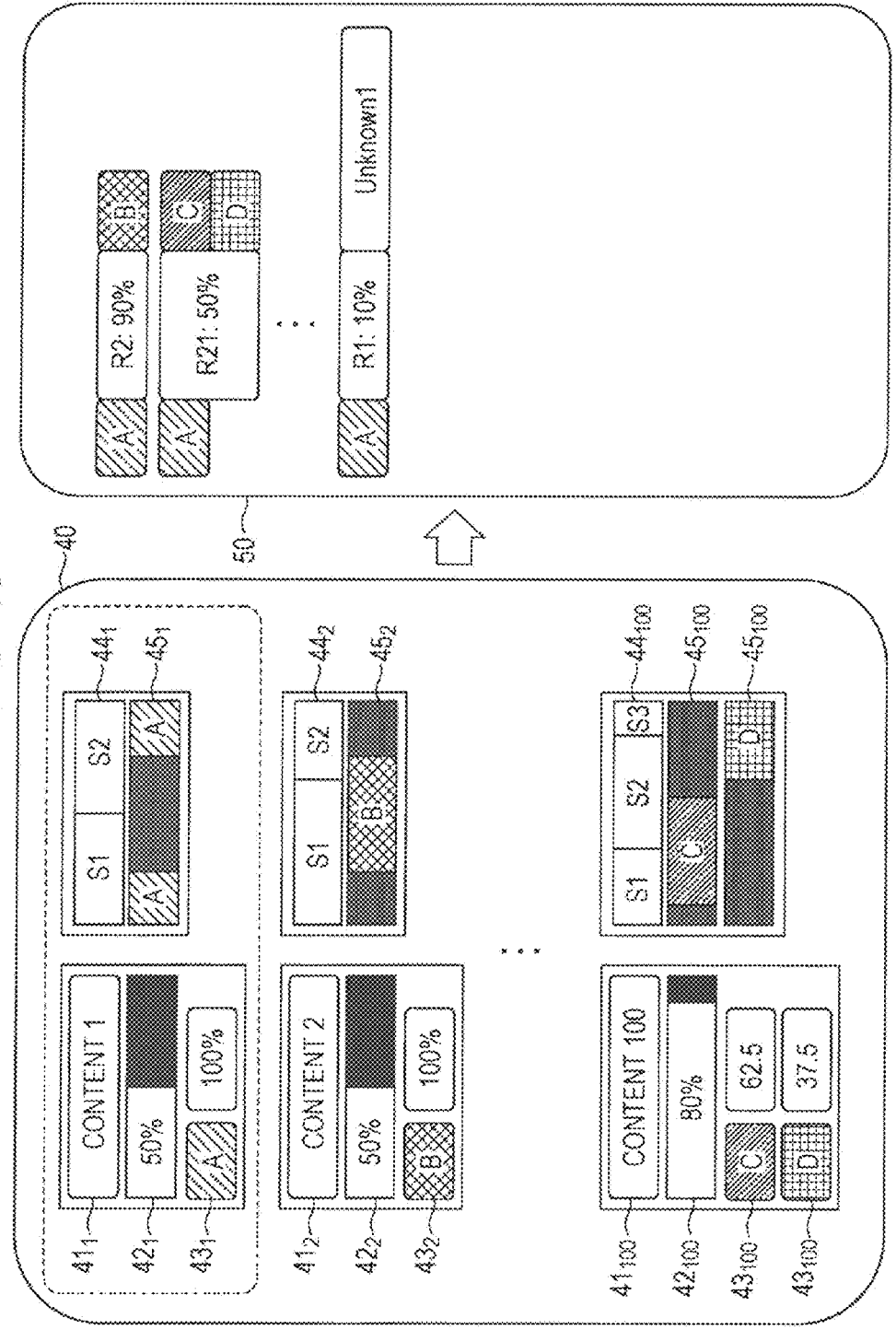
FIG. 18 is a diagram describing a transition from the content view to the relationship view.

FIG. 18 illustrates a transition from the content view 40 to the relationship view 50, in a case where the character "Mr. A" is determined as an interested character according to the fact that the "Content 1" in the content view 40 illustrated in FIG. 2 is selected. The content view 40 in the left side of FIG. 18 is displayed by the process of STEP S21, and the relationship view 50 in the right side of FIG. 18 is displayed by the process of STEP S23. In the relationship view 50 in the right side of FIG. 18, the character-relation information of the character "Mr. A" determined as the interested character is displayed.

In the operation unit 16, the user performs an operation of selecting a character related to the interested character (hereinafter, referred to as related character) with reference to the character-relation information of the interested character indicated in relationship view 50. Then, the operation unit 16 specifies the related character selected by the user, and supplies the information indicating the related character to the content view control unit 21 in STEP S24.

In STEP S25, the content view control unit 21 recognizes the related character selected by the user using the information from the operation unit 16, and causes the content view 40 that indicates the video content of the related character, to be displayed on the display unit 15.

Figure 19:
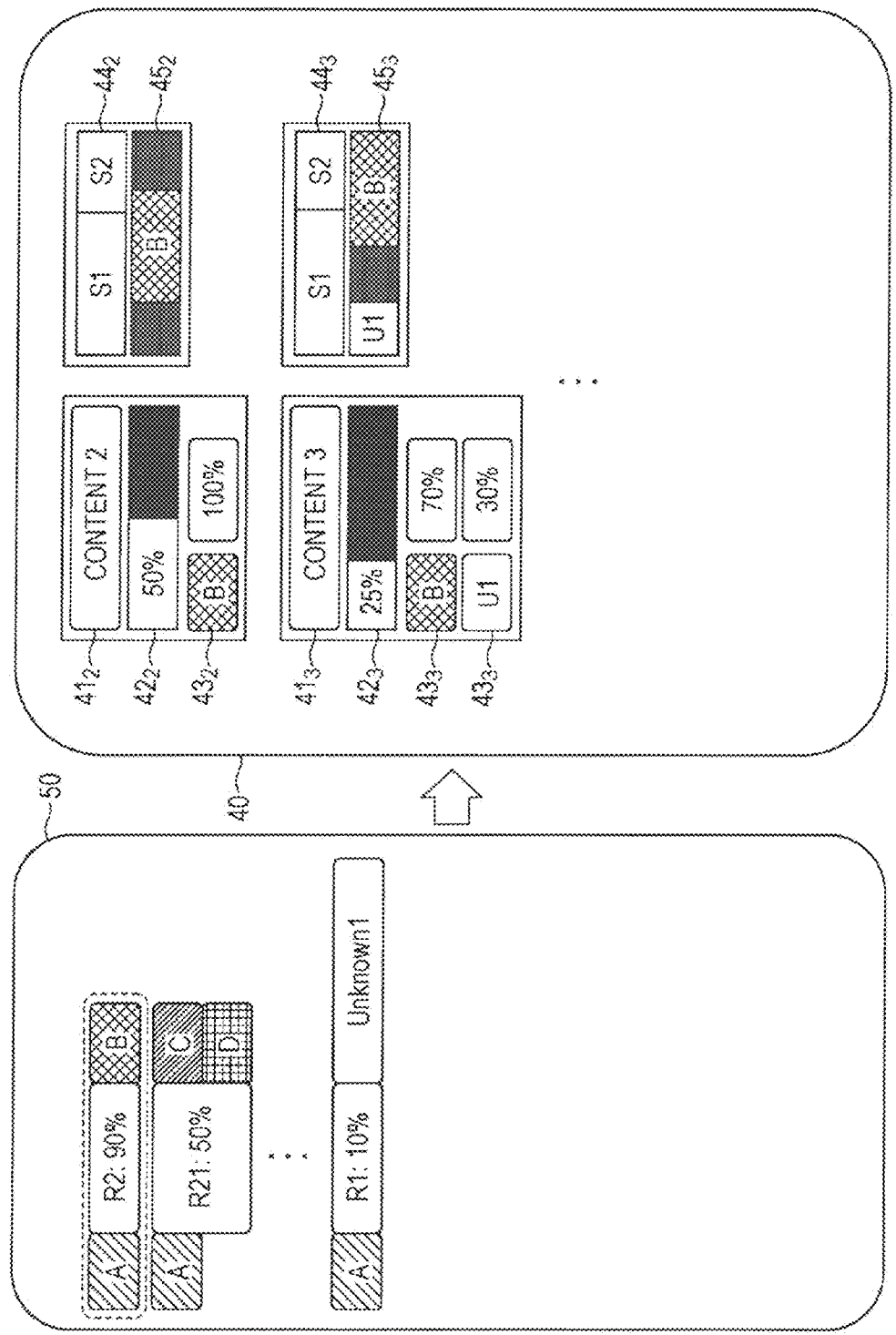
FIG. 19 is a diagram describing the transition from the content view to the relationship view.

FIG. 19 illustrates a transition from the relationship view 50 to the content view 40, in a case where the character "Mr. B" who is related to the character "Mr. A" with a relationship degree of 90% is determined as the related character, according to the fact that the relationship information R2 in the relationship view 50 illustrated in FIG. 18 is selected.

In the content view 40 illustrated in the right side of FIG. 19, the character statistic information of the video content related to the selected character "Mr. B" is indicated.

Examples of video content which has a relation with the related character "Mr. B" are "Content 2" and "Content 3". The video content of the "Content 2" indicates that the rate in which the character is appearing is 50%, and 100% thereof is the scene of "Mr. B". The video content of "Content 3" indicate that the rate in which character is appearing is 25%, and 70% thereof is the scene of "Mr. B" and 30% is the scene of "Mr. Unknown 1 (U1)".

In this way, it is possible to search for the desired video content from the relations of the characters in the video content.

Figure 20:
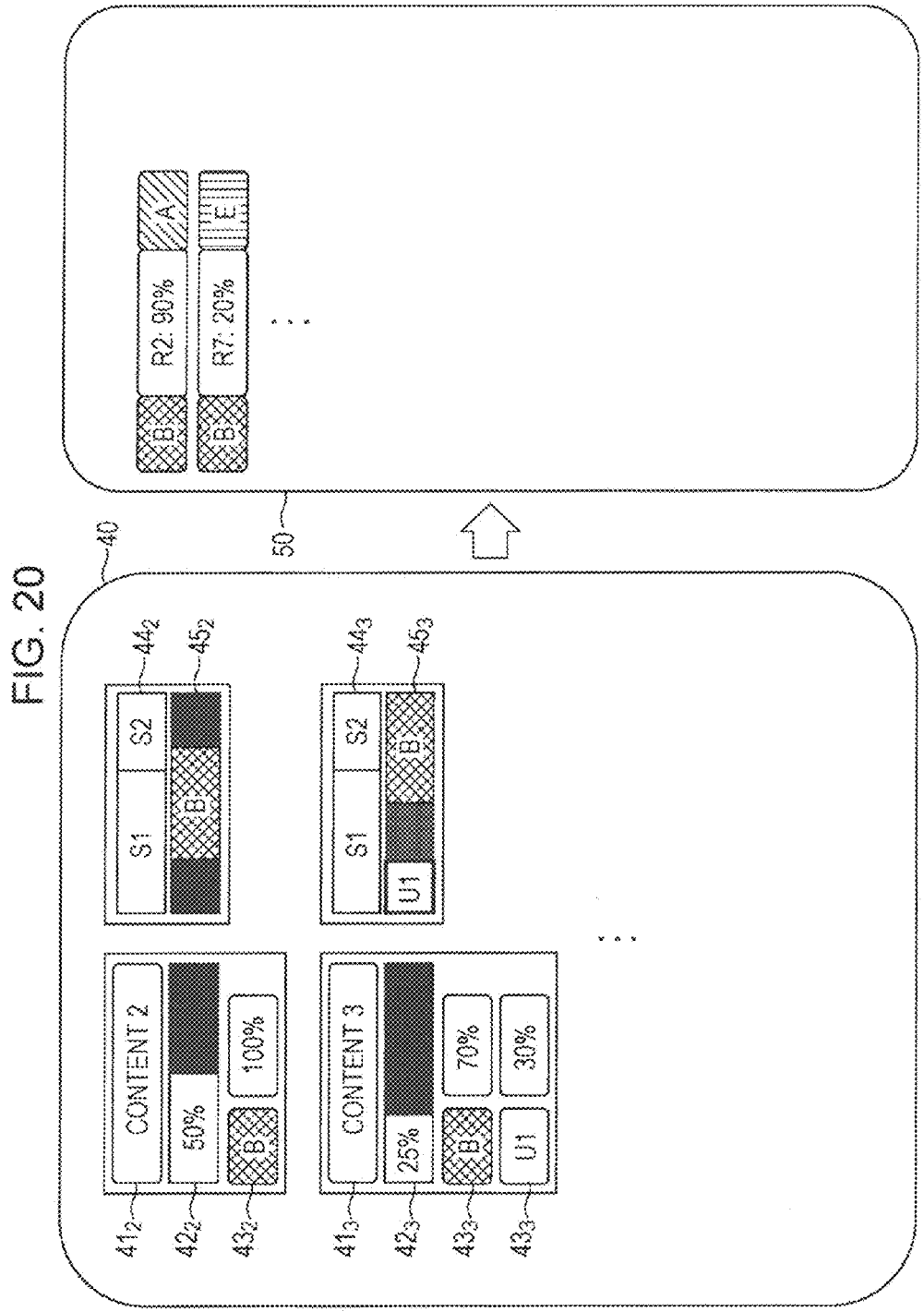
FIG. 20 is a diagram describing the transition from the content view to the relationship view.

As illustrated in FIG. 20, it is also possible to further transit from the content view 40 of the related character Mr. B to the relationship view 50 of Mr. B. In this way, by repeating the selection of content by the content view 40 and the selection of the character-relation information by the relationship view 50, it is possible to reach desired video content.

For example, using video content recently taken by a digital camera, from the video content previously taken, a scene related to the character of the video content recently taken can be obtained, and it is possible to contribute to the re-use of the video content.

Second Method of Searching Video Content

Next, a second method of searching for the video content will be described, in which the video content is searched out with the relationship view 50 as a starting point.

Figure 21:
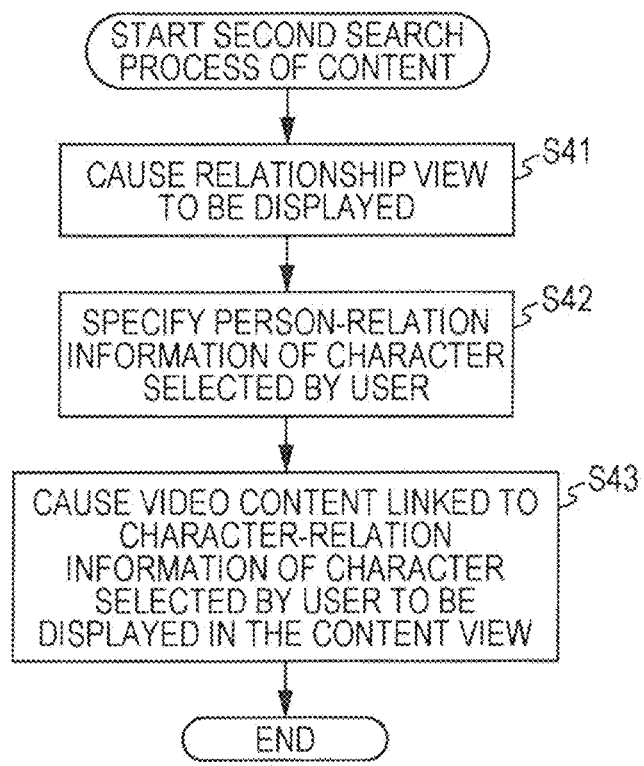
FIG. 21 is a flow chart describing a second searching process of content.

FIG. 21 illustrates a flow chart of a second searching process of the content in which the second method of searching for the video content is applied.

In the second method of searching for the video content, firstly in STEP S41, the relation view control unit 22 causes the relationship view 50 to be displayed of the display unit 15. Here, the character-relation information (relationship information) of the all characters appearing in the entire video content based on the meta data of the entire video content stored in the meta data DB 13B is displayed.

In the operation unit 16, the user performs an operation of selecting a desired character-relation information from the character-relation information indicated in relationship view 50. Then, the operation unit 16 specifies the character-relation information selected by the user, and supplies the information indicating the character-relation information to the content view control unit 21 in STEP S42.

In STEP S43, the content view control unit 21 causes the character statistic information of the video content which is linked to the character-relation information selected by the use to be indicated in the content view 40.

Figure 22:
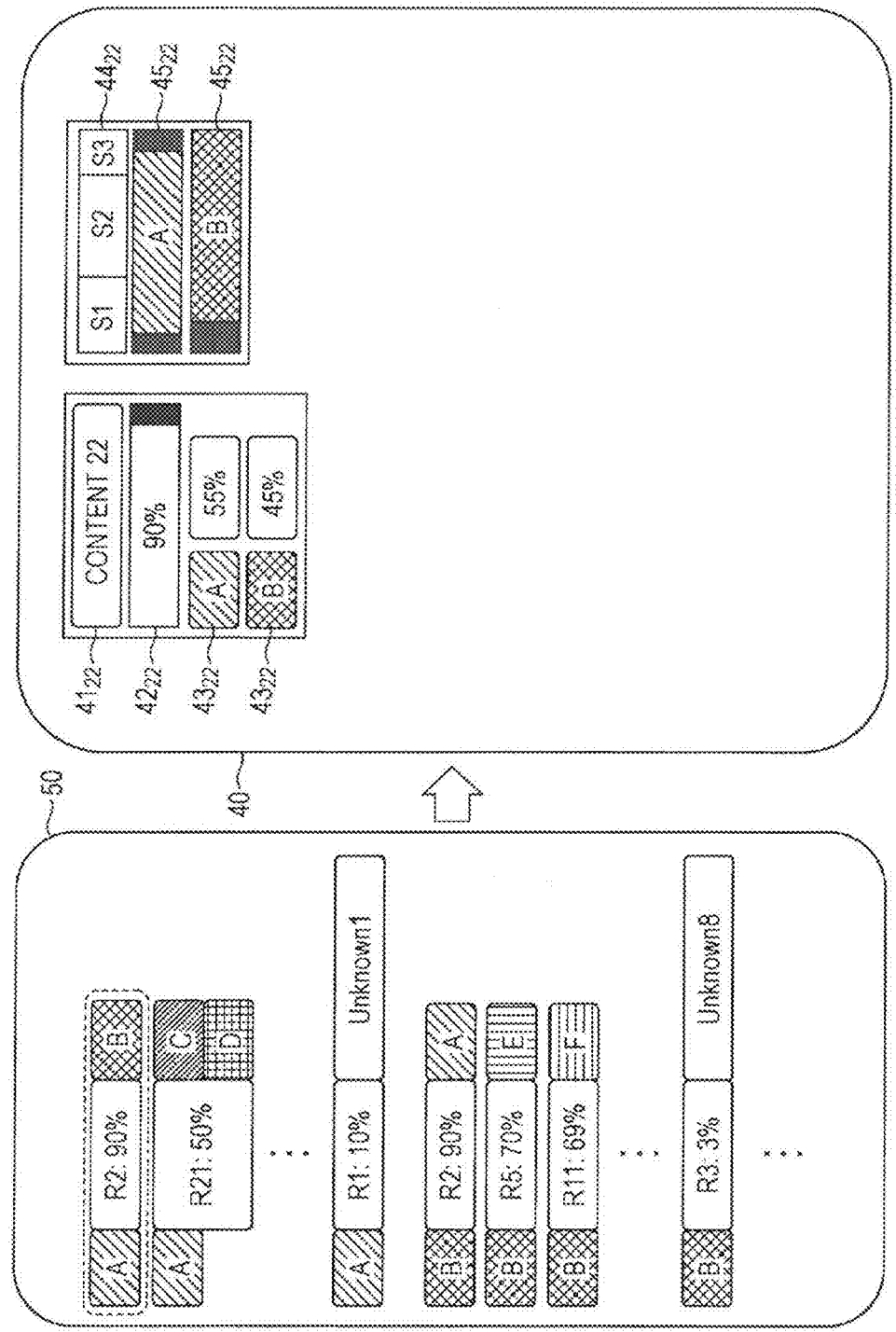
FIG. 22 is a diagram describing the transition from the content view to the relationship view.

FIG. 22 illustrates a transit from the relationship view 50 to the content view 40 in a case where the relationship information R2 in which "Mr. A" and "Mr. B" have the relationship degree of 90% is selected, in the relationship view 50 that indicates the character-relation information of the entire video content. The relationship view 50 in the left side of FIG. 22 is displayed by the process in STEP S41 and the content view 40 in the right side of FIG. 22 is displayed by the process of STEP S43.

Since the relationship information R2 in which "Mr. A" and "Mr. B" have the relationship degree of 90% indicates the relationship degree of "Mr. A" and "Mr. B" in the content 22, in the content view 40 in the right side of FIG. 22, the statistic information of the character of the content 22 is displayed.

Example of GUI Screen

Next, an example of the GUI screen using the content view 40 and the relationship view 50 described above will be described.

Figure 23:
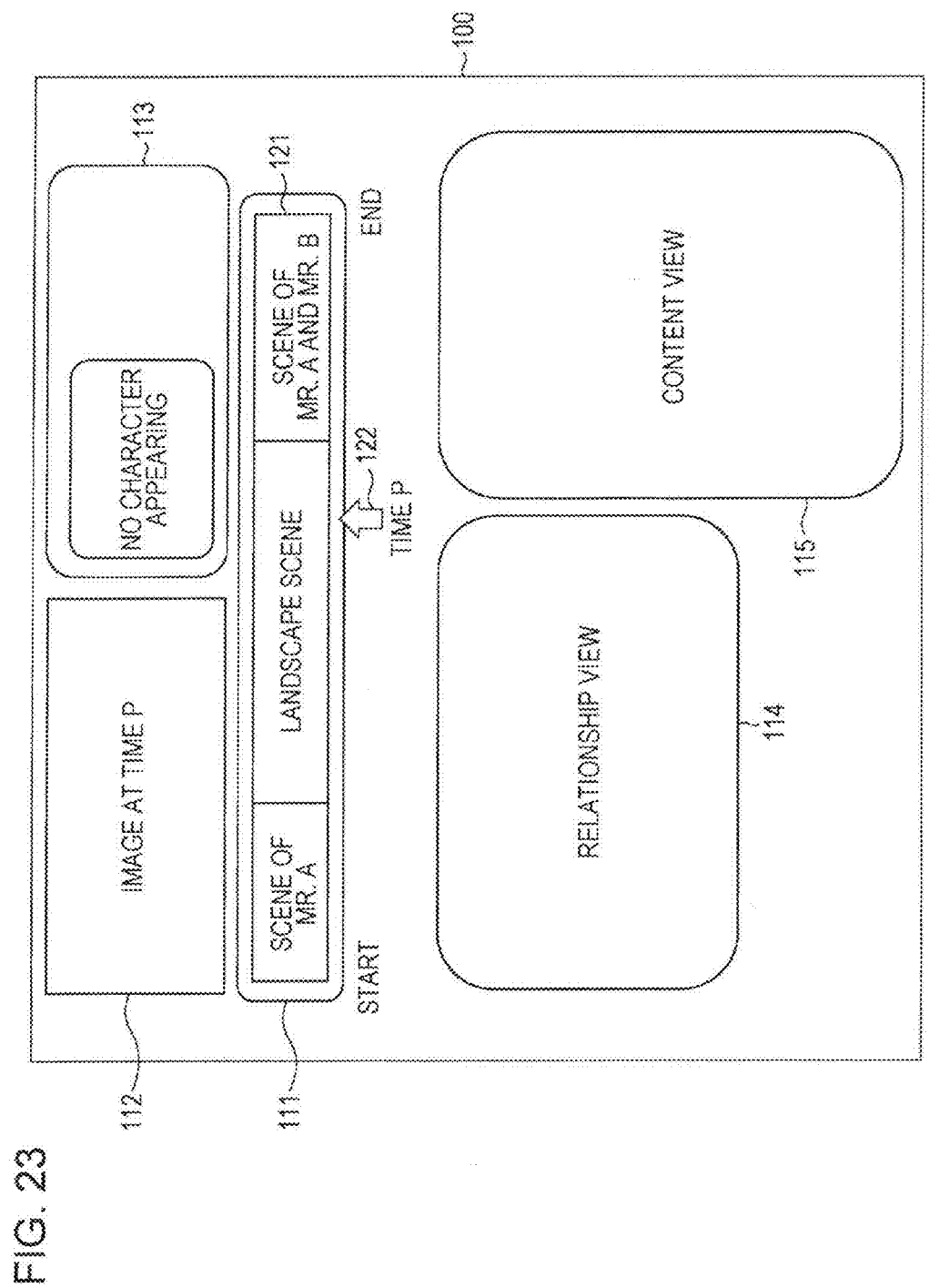
FIG. 23 is a diagram illustrating an example of a GUI screen using the content view and the relationship view.

The GUI screen 100 illustrated in FIG. 23, by which a digest (overview) of the video content stored in the content DB 13A can be seen, has a function of searching for the desired video content from the relativity of the characters appearing in the content of the digest is displayed. The GUI screen 100 is generated by the search control unit 14 using the meta data of the content stored in the meta data DB 13B, and is displayed on the display unit 15.

The GUI screen 100 includes a time line display unit 111, a still image viewer (still image display unit) 112, a character display unit 113, a relationship view 114, and a content view 115.

In the time line display unit 111, a time line 121 and an indicator 122 are displayed.

The time line 121 displays the characters on each time in the video content. The time line 121 has a rectangular shape, and the horizontal width thereof corresponds to the reproducing time of the video content, the horizontal axis of the rectangle is a time axis where the left end represents start time and the right end represents the end time.

The user can designate a predetermined time in the content by moving the indicator 122 in the horizontal direction. In the still image viewer 112, the still image corresponding to the time pointed and designated by the indicator 122 is displayed. In the example in FIG. 23, a still image at the time P pointed and designated by the indicator 122 is displayed on the still image viewer 112.

In addition, in a case where a character is appearing in the still image corresponding to the time pointed and designated by the indicator 122, the face image of the character is displayed on the character display unit 113. In the example in FIG. 23, the still image at time P is a scene of landscape, there is no character appearing. Therefore, nothing is displayed on the character display unit 113 ("no character appearing" is displayed).

The relationship view 114 corresponds to the relationship view 50 described above, and displays the character-relation information of the character appearing in the video content. The content view 115 corresponds to the relationship view 50 described above, and displays the statistic information of the characters appearing in the video content. However, since the relationship view 114 and the content view 115 may not be displayed when the characters are not specified, nothing is displayed in this stage.

Figure 24:
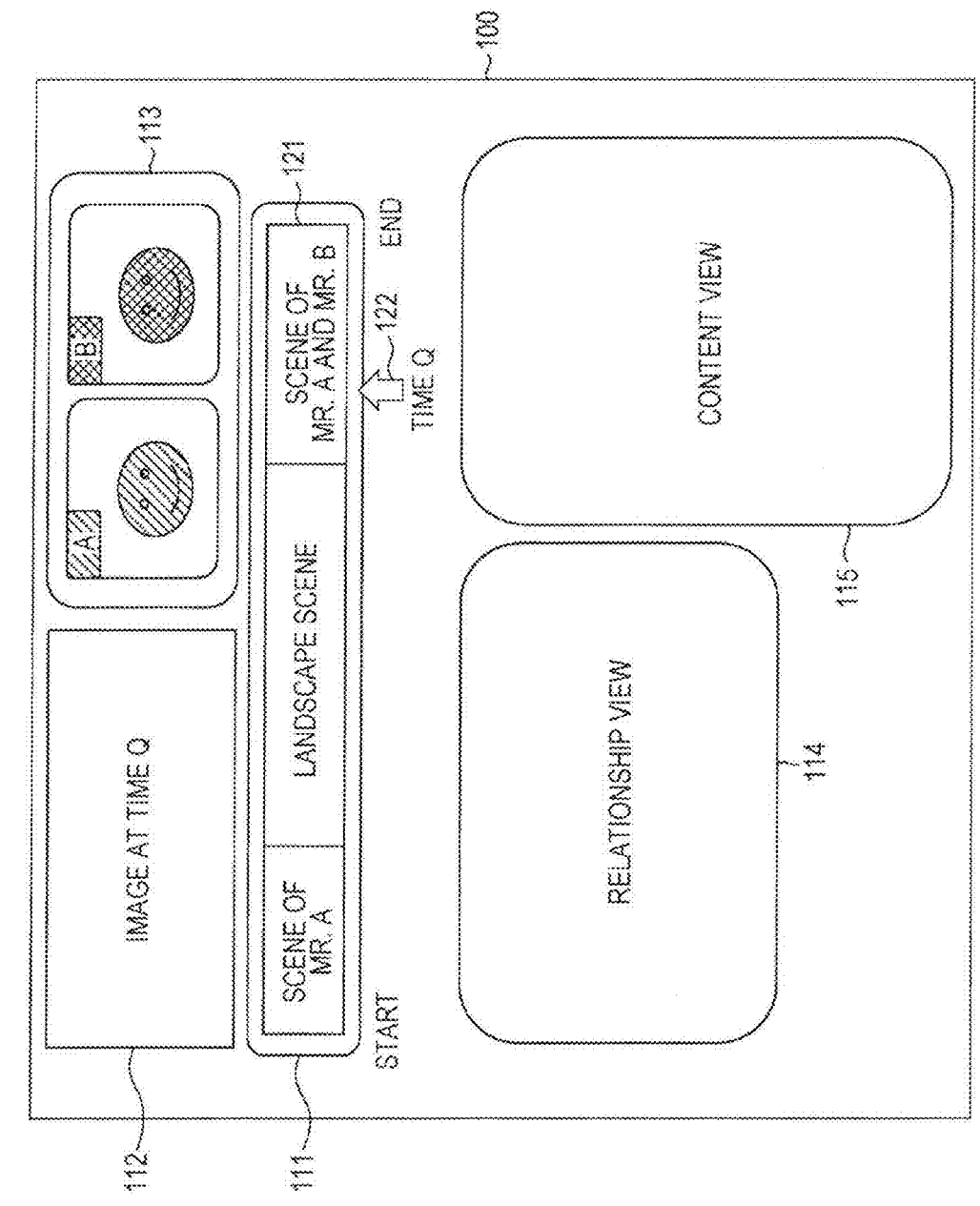
FIG. 24 is a diagram illustrating an example of the GUI screen using the content view and the relationship view.

For example, as illustrated in FIG. 24, in a case where the time Q when the scene in which the characters "Mr. A" and "Mr. B" are appearing is pointed and designated by the indicator 122 moved by the user, the still image at time Q is displayed on the still image viewer 112 and the face image of "Mr. A" and "Mr. B" are displayed on the character display unit 113.

Figure 25:
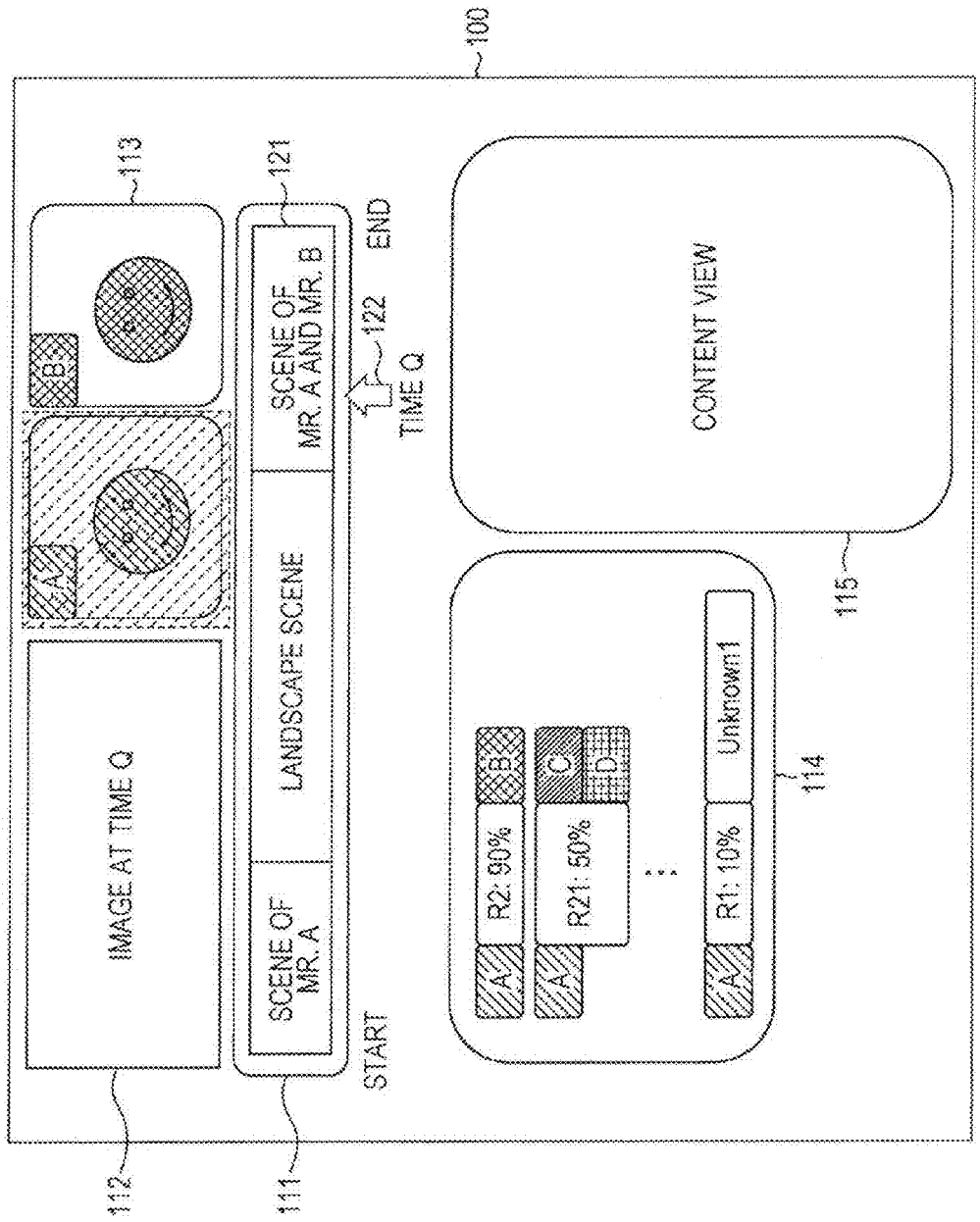
FIG. 25 is a diagram illustrating an example of the GUI screen using the content view and the relationship view.

Among the face image of "Mr. A" and "Mr. B" displayed on the character display unit 113, as illustrated in FIG. 25, when "Mr. A" is selected as an interested character by a cursor or the like, the character-relation information of Mr. A is displayed in the relationship view 114.

Figure 26:
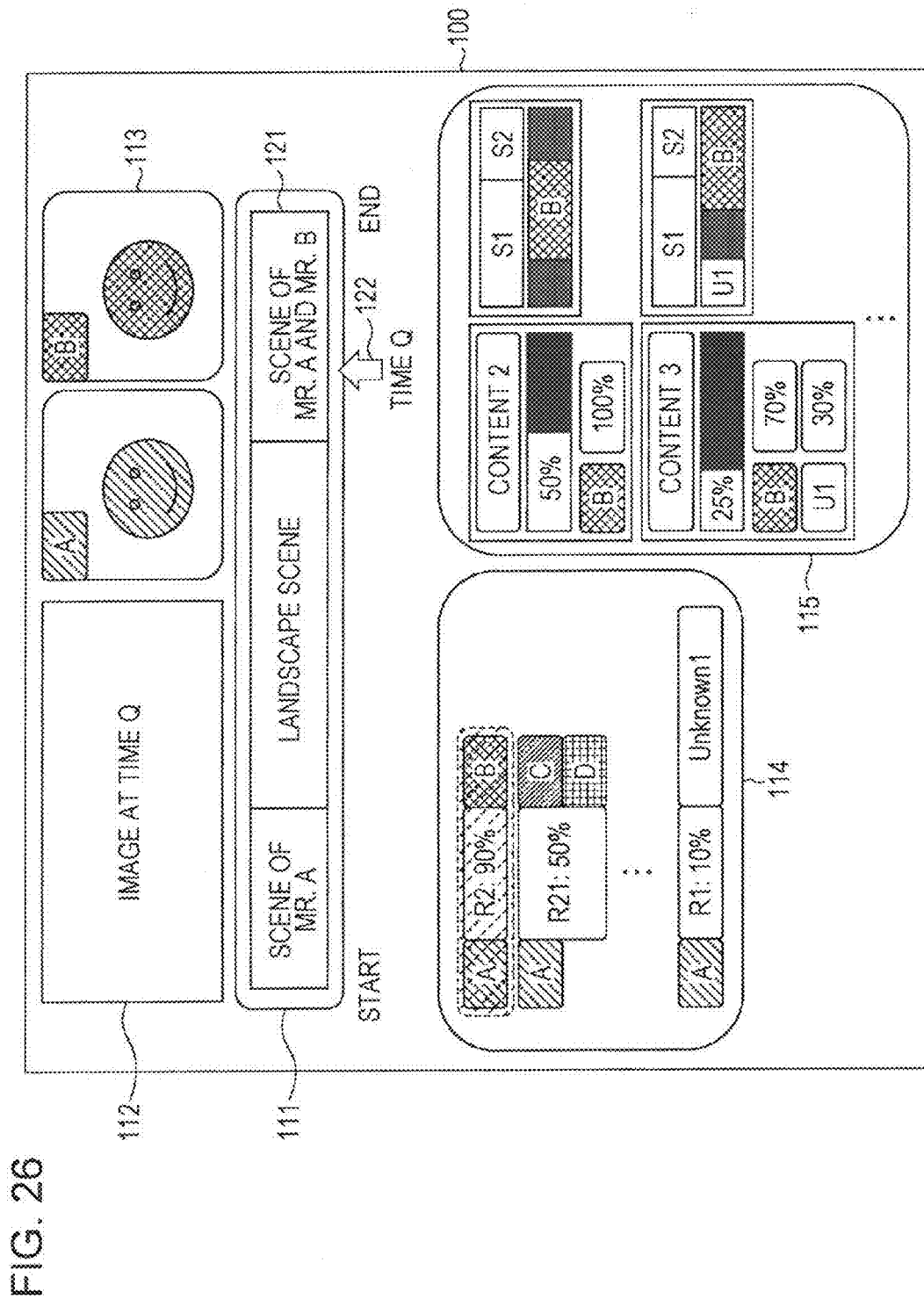
FIG. 26 is a diagram illustrating an example of the GUI screen using the content view and the relationship view.

Then, for example, among the character-relation information of the interested character "Mr. A" displayed in the relationship view 114, the relationship information R2 that indicates the relationship with "Mr. B" who is associated with "Mr. A" in a relationship degree of 90%, as illustrated in FIG. 26. Then, the statistic information of the video content related to "Mr. B" is displayed in the content view 115. That is, the statistic information of the video content regarding the related character "Mr. B" related to the interested character "Mr. A" is displayed in the content view 115.

In this way, by selecting a character appearing in video content as a starting point, it is possible to search for video content of the related character who has a relationship with that character.

In the example described above, in the relationship view 114, the character-relation information (relationship information) is selected. However, the related character may be directly selected. For example, in the relationship view 114 in FIG. 26, "Mr. B" in the relationship information R2, "Mr. C" or "Mr. D" in the relationship information R21, or "Mr. Unknown 1" in the relationship information R1 may be directly selected.

In this way, as described above, in the image processing apparatus 1 to which the present disclosure is applied, regarding the video content, the character-relation information of the character and the statistic information of the character are generated as the meta data to be stored, using the still image time-series data.

Then, the image processing apparatus 1 can present the video content that has a relationship with the character in the relationship view 114 (relationship view 50) or the content view 115 (content view 40), based on the character-relation information of the characters and the statistic information of the characters generated in advance.

By using the relationship of the characters, it is possible to search for the scene of the video content which may not be searched out in case of using a spatial feature amount of image such as a histogram of color space information or a histogram of an edge.

In addition, by changing the relationship degree coefficient K, it is also possible to search for the video content which has no relationship with the character as well as the video content which has an intensive relationship with the character. By using the relationship degree coefficient K, in searching for the video content using the character, it is possible to cause the relationship of the character to have variations.

Example of Applying to Computer

The series of processes described above may be performed by the hardware, and also may be performed by the software. In a case where the series of the processes are performed by the software, a program configuring the software is installed in the computer. Here, the examples of computers may include a computer that is built into the dedicated hardware, and for example, a general-purpose personal computer that is capable of performing various functions by installing various programs therein.

FIG. 27 is a block diagram illustrating an example of the configuration of the hardware of the computer that performs the above-described series of processes by the program.

In the computer, a Central Processing Unit 201 (CPU), a Read Only Memory (ROM) 202, a Random Access Memory (RAM) 203 are connected to each other by a BUS 204.

To the BUS 204, an input-output interface 205 is further connected. To the input-output interface 205, an input unit 206, an output unit 207, a storage unit 208, a communication unit 209, and a driver 210 are connected.

A keyboard, a mouse, and a microphone and the like are the input unit 206. A display, a speaker and the like are the output unit 207. A hard disk or a nonvolatile memory and the like are the storage unit 208. A network interface and the like is the communication unit 209. The driver 210 drives the removable recording medium 211 such as a magnetic disk, an optical disc, an optical magnetic disk, or a semiconductor memory.

In the computer configured as described above, the series of processes described above is performed by the program stored in the storage unit 208 being loaded on the RAM 203 via the input-output interface 205 and the BUS 204 by the CPU 201 to be executed, for example.

In the computer, the program can be installed in the storage unit 208 via the input-output interface 205 by mounting the removable recording medium 211 on the driver 210. In addition, the program is received by the communication unit 209 via wired or wireless transmission media such as a local area network, internet, or digital satellite broadcasting, and can be installed in the storage unit 208. In addition, the program can be installed in the ROM 202 or in the storage unit 208 in advance.

The program executed by the computer may be a program that performs the processes in accordance with the time series order described herein, and may be a program that performs the processes in parallel or at a necessary timing such as when the call occurs.

The embodiment of the present disclosure is not limited to the embodiments described above, and a variety of modifications may be made without departing from the scope of the present disclosure.

For example, the plurality of embodiments described above can be adopted in its entirety or in a form of combinations thereof.

For example, the present disclosure can have a configuration of cloud computing in which one function is shared by a plurality of devices via a network to be processed in collaboration.

In addition, each STEP in the flow chart described above can be shared by a plurality of devices to be performed, other than being performed by one device.

Furthermore, in a case where a plurality of processes are performed in one STEP, the plurality of processes included in such one STEP can be shared by the plurality of devices to be performed, other than being performed by one device.

In addition, the present disclosure may have configurations as follows.

1. The image processing apparatus that includes the display control unit that causes the content view which displays statistic information of characters appearing in the video content and the relationship view which displays character-relation information of the characters appearing in the video content, to be displayed on the predetermined display unit.

2. The image processing apparatus according to above described 1, in which, in a case where the predetermined character whose static information is displayed in the content view is selected, the display control unit causes the character-relation information of the selected character, to be displayed in the relationship view.

3. The image processing apparatus according to above described 1 or 2, in which, in a case where the predetermined character-relation information in the relationship view is selected, the display control unit causes the statistic information of the character whose character-relation information is selected, to be displayed in the content view.

4. The image processing apparatus according to any of above described 1 to 3, in which the display control unit causes the content view and the relationship view to be displayed on the display unit at the same time.

5. The image processing apparatus according to any of above described 1 to 4, in which, in a case where a character appears at a predetermined time with respect to the video content, the display control unit further causes a face image of the character to be displayed on the display unit.

6. The image processing apparatus according to above described 5, in which, in a case where the face image displayed in the display unit is selected, the display control unit causes the character-relation information of the character of the selected face image, to be displayed in the relationship view.

7. The image processing apparatus according to any of above described 1 to 6, that further includes the meta data generation unit which generates the statistic information and the character-relation information as meta data of the video content, and the storage unit which stores the generated meta data.

8. The image processing apparatus according to any of above described 1 to 7, in which the statistic information is the character appearance rate which is the rate of the characters' appearing in the video content, and the appearance rate per each of the characters.

9. The image processing apparatus according to any of above described 1 to 8, in which the character-relation information is the rate in which the characters are appearing at the same time in the same video content or in the same scene.

10. The image processing apparatus according to above described 9, in which an intensity of the relationship in a case where the characters are appearing at the same time in the same video content or in the same scene, is controlled with the relationship degree coefficient.

11. The image processing apparatus according to above described 10, in which the relationship degree coefficient is controlled so as to be intensive in the relationship degree in a case where the characters are appearing at the same time in the same video content or in the same scene.

12. The image processing apparatus according to above described 10 or 11 that further includes the setting unit which sets the relationship degree coefficient.

13. The image processing apparatus according to any of above described 7 to 12, in which the meta data generation unit identifies the character from the time-series data of the still image extracted in the predetermined time interval from still images of the video content, generates the appearance pattern of the identified character, and generates the static information and the character-relation information based on the generated appearance pattern.

14. The image processing method that includes causing the content view which displays statistic information of characters appearing in the video content and the relationship view which displays character-relation information of the characters appearing in the video content to be displayed on the predetermined display unit.

15. The program which causes the computer to function as the display control unit that causes the content view which displays statistic information of characters appearing in the video content and the relationship view which displays character-relation information of the characters appearing in the video content to be displayed on the predetermined display unit.

The present disclosure contains subject matter related to that disclosed in Japanese Priority Patent Application JP 2012-213527 filed in the Japan Patent Office on Sep. 27, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a scene change detection unit that identifies scenes in video content in response to detecting a scene change;
a feature amount extraction unit that detects image features to identify whether characters appear in the identified scenes;
an image recognition unit that identifies individual characters based on the image features of particular characters;
a display control unit that causes (a) a content view which displays statistic information of characters appearing in the video content, the statistic information including (i) first displayed statistic information that represents how many of all of the scenes in the video content are character scenes, wherein a character scene contains the appearance of at least one character, and (ii) second displayed statistic information representing in how many of the character scenes a particular character appears, and (b) a relationship view which displays character-relation information of the identified individual characters appearing in the video content, to be displayed on a predetermined display unit, the character-relation information representing the proportion of scenes or content in which the particular character appears in the same scene or the same content with others of said individual characters.

2. The image processing apparatus according to claim 1, wherein, when a predetermined character whose statistic information is displayed in the content view is selected, the display control unit causes the character-relation information of the selected character, to be displayed in the relationship view.

3. The image processing apparatus according to claim 1, wherein, when a predetermined character-relation information in the relationship view is selected, the display control unit causes the statistic information of the character whose character-relation information is selected, to be displayed in the content view.

4. The image processing apparatus according to claim 1, wherein the display control unit causes the content view and the relationship view to be displayed on the display unit at the same time.

5. The image processing apparatus according to claim 1, wherein, in a case where a character appears at a time predetermined with respect to the video content, the display control unit further causes a face image of the character to be displayed on the display unit.

6. The image processing apparatus according to claim 5, wherein, in a case where the face image displayed in the display unit is selected, the display control unit causes the character-relation information of the character of the selected face image, to be displayed in the relationship view.

7. The image processing apparatus according to claim 1, further comprising:
a meta data generation unit that generates the statistic information and the character-relation information as meta data of the video content; and
a storage unit that stores the generated meta data.

8. The image processing apparatus according to claim 1, wherein an intensity of a relationship in a case where the characters are appearing at the same time in the same video content or in the same scene, is controlled with a relationship degree coefficient.

9. The image processing apparatus according to claim 8, wherein the relationship degree coefficient is controlled so as to be intensive in a case where the characters are appearing at the same time in the same video content or in the same scene.

10. The image processing apparatus according to claim 8, further comprising:
a setting unit that sets the relationship degree coefficient.

11. The image processing apparatus according to claim 7, wherein the meta data generation unit identifies a character from the time-series data of a still image extracted in a predetermined time interval from still images of the video content, and generates an appearance pattern of the identified character, and generates the static information and the character-relation information based on the generated appearance pattern.

12. An image processing method comprising:
detecting scene changes in video content to identify scenes;
detecting image features to identify whether characters appear in the identified scenes;
identifying individual characters based on the image features of particular characters;
causing (a) a content view which displays statistic information of characters appearing in the video content, the statistic information including (i) first displayed statistic information that represents how many of all of the scenes in the video content are character scenes, wherein a character scene contains the appearance of at least one character, and (ii) second displayed statistic information representing in how many of the character scenes a particular character appears, and (b) a relationship view which displays character-relation information of the identified individual characters appearing in the video content to be displayed on a predetermined display unit, the character-relation information representing the proportion of scenes or content in which the particular character appears in the same scene or the same content with others of said individual characters.

13. A non-transitory computer readable medium on which is recorded a program that, when read, causes a computer to function as a scene change detection unit that identifies scenes in video content in response to detecting a scene change;

a feature amount extraction unit that detects image features to identify whether characters appear in the identified scenes;

an image recognition unit that identifies individual characters based on the image features of particular characters; and a display control unit that causes (a) a content view which displays statistic information of characters appearing in the video content, the statistic information including (i) first displayed statistic information that represents how many of all of the scenes in the video content are character scenes, wherein a character scene contains the appearance of at least one character, and (ii) second displayed statistic information representing in how many of the character scenes a particular character appears, and (b) a relationship view which displays character-relation information of the identified individual characters appearing in the video content to be displayed on a predetermined display unit, the character-relation information representing the proportion of scenes or content in which the particular character appears in the same scene or the same content with others of said individual characters.

* * * * *